United States Patent
Fogwill et al.

(10) Patent No.: US 11,554,331 B2
(45) Date of Patent: Jan. 17, 2023

(54) METHOD AND APPARATUS FOR MINIMIZING THE CHROMATOGRAPHIC BAND DISTORTION OF A BACK PRESSURE REGULATOR

(71) Applicant: Waters Technologies Corporation, Milford, MA (US)

(72) Inventors: Michael O. Fogwill, Uxbridge, MA (US); Joseph D. Michienzi, Plainville, MA (US); Joshua A. Shreve, Acton, MA (US); Scott Kelley, Brookline, MA (US); Emily J. Berg, Allison Park, PA (US)

(73) Assignee: Waters Technologies Corporation, Milford, MA (US)

( * ) Notice: Subject to any disclaimer, the term of this patent is extended or adjusted under 35 U.S.C. 154(b) by 216 days.

(21) Appl. No.: 15/930,683

(22) Filed: May 13, 2020

(65) Prior Publication Data

US 2020/0360836 A1 Nov. 19, 2020

Related U.S. Application Data

(60) Provisional application No. 62/848,081, filed on May 15, 2019.

(51) Int. Cl.
*B01D 15/14* (2006.01)
*B01D 15/16* (2006.01)
*B01D 15/40* (2006.01)
*G01N 30/32* (2006.01)
*F16K 1/38* (2006.01)
*F16K 25/00* (2006.01)
*F15B 13/02* (2006.01)
*F15B 13/04* (2006.01)

(52) U.S. Cl.
CPC .......... *B01D 15/163* (2013.01); *B01D 15/14* (2013.01); *B01D 15/40* (2013.01); *F16K 1/38* (2013.01); *F16K 25/00* (2013.01); *F15B 13/024* (2013.01); *F15B 13/04* (2013.01); *G01N 2030/328* (2013.01)

(58) Field of Classification Search
CPC ...... B01D 15/163; B01D 15/14; B01D 15/40; F16K 1/38; F16K 25/00; F15B 13/024; F15B 13/04; G01N 2030/328
See application file for complete search history.

(56) References Cited

U.S. PATENT DOCUMENTS

| | | | |
|---|---|---|---|
| 2011/0233299 A1 | 9/2011 | Berger et al. | |
| 2015/0021265 A1* | 1/2015 | Jackson | F04B 15/08 210/137 |
| 2015/0047500 A1* | 2/2015 | Shreve | B01D 15/10 210/656 |

OTHER PUBLICATIONS

Chester et al. "Pressure-regulating fluid interfact and phase behavior considerations in the coupling of packed-column supercritical fluid chromatography with low-pressure detectors." J. Chromatogr. A. 807(1998): 265-273.

* cited by examiner

*Primary Examiner* — Benjamin L Lebron
(74) *Attorney, Agent, or Firm* — Womble Bond Dickinson (US) LLP; Deborah M. Vernon

(57) ABSTRACT

The technology generally relates to tailoring a back pressure regulator in a chromatographic system to reduce unswept volume within the back pressure regulator to achieve better sample detection and a reduction in chromatographic band distortion effects.

16 Claims, 21 Drawing Sheets

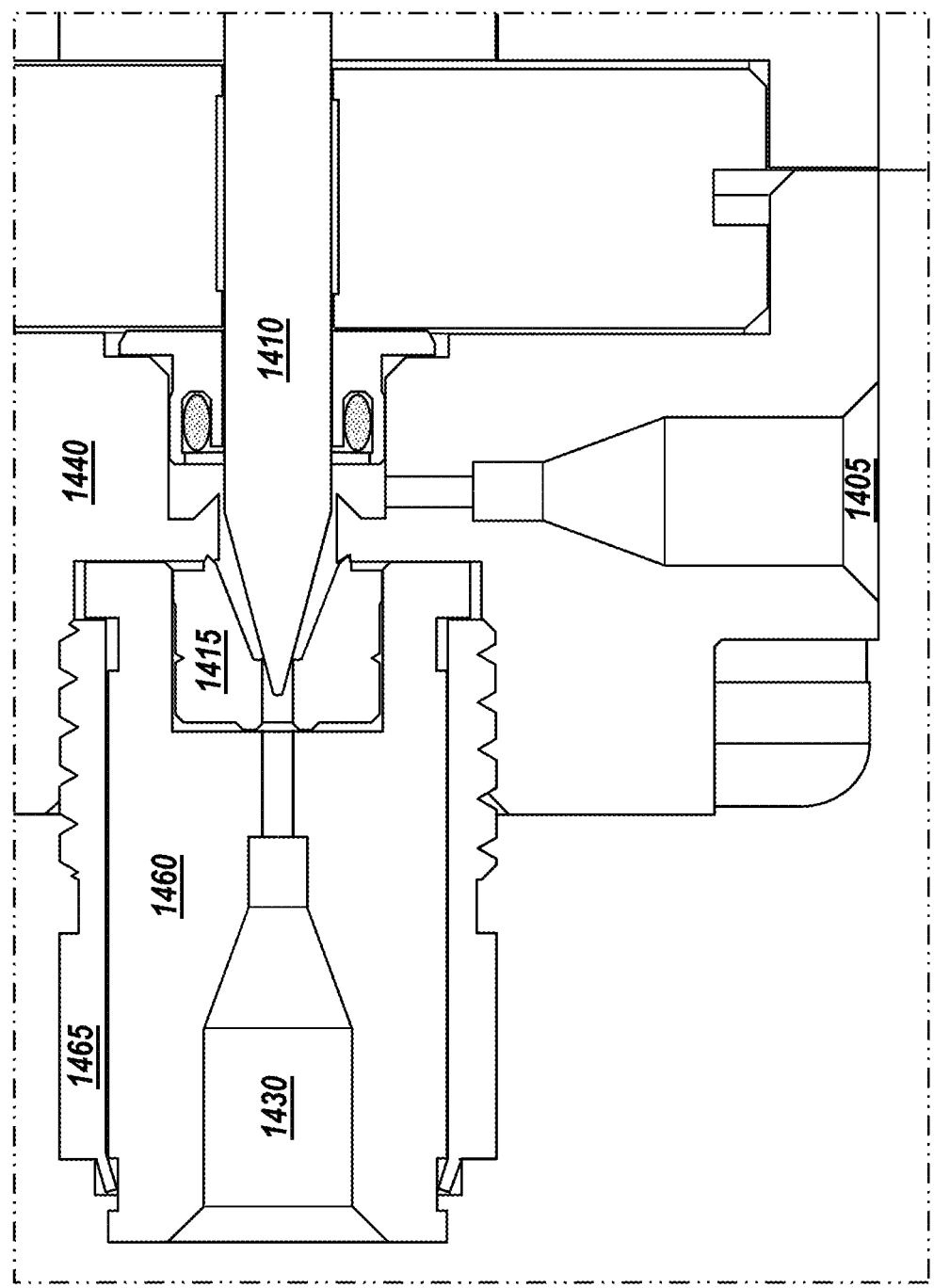

METHOD AND APPARATUS FOR MINIMIZING THE CHROMATOGRAPHIC BAND DISTORTION OF A BACK PRESSURE REGULATOR

RELATED APPLICATIONS

This Application claims priority to U.S. Provisional Patent Application 62/848,081, filed on May 15, 2019, the contents of which are hereby incorporated by reference in their entirety.

FIELD OF THE INVENTION

The present invention generally relates to devices and methods for optimizing the performance of back pressure regulators in chromatography systems.

BACKGROUND

Certain chromatography systems utilize a back pressure regulator (BPR) to control pressure within the system. The BPR is used to control upstream pressure by adjusting flow of solvent through the BPR. In other words, the BPR provides a variable restrictor controlling flow such that restricting flow increases upstream pressure and increasing flow reduces upstream pressure. The ultimate pressure source in the system is one or more pumps or pressurized solvent sources upstream of the BPR. Downstream of the BPR pressure will generally be less than it is upstream of the BPR.

In some chromatography systems, the BPR may be situated after the detector. In such an arrangement, the eluate passes to the detector and the chromatogram is obtained before the eluate passes through the BPR. In this circumstance, extra-column band broadening associated with the BPR is of little concern.

In other systems, however, the detector may be placed after the BPR. For example, some detectors operate more efficiently at a lower pressure and therefore are preferably located in the low pressure area downstream of the BPR. Examples of such detectors include, but are not limited to, mass spectrometers and UV detectors. In systems with the detector after the BPR, the BPR may contribute to extra-column band broadening. Extra-column band broadening is an effect whereby a sample band spreads longitudinally as it passes through elements of the system other than the column and before the detector (i.e., extra-column volume). Extra-column band broadening reduces the quality of the separation and may result in broad and potentially overlapping chromatogram peaks. A particular band-broadening effect is associated with unswept volume. Unswept volumes are portions accessible to the flowstream, but not within the primary solvent flowpath. Portions of the solvent flow may diffuse into and out of the unswept volume at an irregular rate, resulting in band-broadening. Additionally, in a preparatory system, band broadening may reduce the quality of separation in the sample collection regardless of detector placement.

SUMMARY

Provided herein are devices and methods for reducing extra-column band broadening caused by a back pressure regulator. Embodiments of the present device may essentially negate the extra-column/unswept volume associated with the back pressure regulator.

One aspect of the present technology is directed to a chromatography system having a detector downstream of a back pressure regulator. The chromatography system includes a mobile phase source configured to provide a mobile phase flow; a chromatographic column downstream of the mobile phase source; a back pressure regulator located downstream of the chromatographic column and having an interior volume; a detector (e.g., a mass spectrometer, a UV detector, etc.) located downstream of the back pressure regulator, such that the system has a flow-through BPR interface configuration; and wherein the back pressure regulator is configured to reduce exposure of the mobile phase flow to the interior volume by (i) receiving a make-up flow wherein the make-up flow channels the mobile phase flow through only a portion of the interior volume or/and (ii) wherein the interior volume is minimized by at least one of (a) positioning an inlet point for the mobile phase flow immediately proximate a constriction point of the back pressure regulator, (b) positioning a seal proximate the inlet point distant from the constriction point, (c) positioning the inlet point such that mobile phase flow is introduced perpendicular to or angled toward a restrictor of the back pressure regulator, (d) positioning an outlet receptor immediately proximate and downstream from the constriction point; or (e) reducing cross-sectional area at interfaces between back pressure regulator components. In some embodiments, the BPR is configured to reduce exposure of the mobile phase flow to the interior volume by (i) alone. In other embodiments, the BPR is configured to reduce exposure of the mobile phase flow to the interior volume by (ii) alone. In still other embodiments, the BPR is configured to reduce exposure of the mobile phase flow to the interior volume by utilizing both (i) and (ii). In some embodiments, the interior volume is minimized using more than one of (a), (b), (c), (d) or (e). That is, certain embodiments can feature utilizing any combination of (a), (b), (c), (d), and (e) including using all five minimization configurations.

One aspect of the present technology is directed to a back pressure regulator. The back pressure regulator includes a channel, a mobile phase inlet within the channel and in fluid communication with a mobile phase source, a make-up flow inlet within the channel and in fluid communication with a make-up flow source (wherein the mobile phase inlet and the make-up flow inlet are disposed to create an offset such that the make-up flow inlet is upstream of the mobile phase inlet), and a variable restrictor in or in communication with the channel and configured to control fluid flow exiting the channel.

The above aspect of the present technology can include one or more of the following features. For example, in one embodiment, the mobile phase inlet is angled toward the variable restrictor. In certain embodiments, the mobile phase inlet is placed immediate upstream of the variable restrictor.

Another aspect of the present technology is directed to a needle-valve-type back pressure regulator including a valve seat having an axial passageway therethrough, a needle (having a tip and a shaft and the needle positioned parallel to the axial passageway of the valve seat and having a range of motion in a direction parallel to the axial passageway such that at one extreme of the range of motion the tip is seated within the axial passageway), a channel positioned adjacent to the valve seat through which at least a position of the needle moves along its range of motion, a headspace constituting a void defined by the unoccupied portions of the axial passageway and the channel, a mobile phase inlet within the headspace, and a make-up flow inlet within the headspace, where the mobile phase inlet and the make-up flow inlet are located at two different and distinct positions within the headspace.

The above aspect of the present technology can include one or more of the following features. For example, in one embodiment, the needle-valve-type back pressure regulator can further include a drive mechanism in communication with the needle. The drive mechanism is configured to determine the position of the needle within its range of motion. In certain embodiments, the mobile phase inlet of the needle-valve-type back pressure regulator is between the make-up flow inlet and the valve seat. In certain embodiments, the mobile phase inlet and the make-up flow inlet are approximately perpendicular to the axial passageway. In some embodiments, the mobile phase inlet is angled toward the valve seat and the make-up flow inlet is approximately perpendicular to the axial passageway. In other embodiments, the mobile phase inlet and the make-up flow inlet are each angled toward the valve seat. In some embodiments, the mobile phase inlet and the make-up flow inlet are offset from each other such that a projection of each on a plane perpendicular to the axial passageway forms an angle of approximately 120 degrees. In some embodiments, the valve seat of the needle-valve-type back pressure regulator includes a restriction. The restriction may be located such that the tip is seated against the restriction at one extreme of the range of motion. In certain embodiments, the mobile phase inlet is as near as practicable to the restriction.

Another aspect of the present technology is directed to a method of operating a back pressure regulator having a needle-and-seat valve including providing a make-up flow to an interior volume of the needle-and-seat valve at a make-up flow inlet; flowing the make-up flow through at least a portion of the interior volume and through a variable restrictor of the needle-and-seat valve to create a flowstream; introducing a mobile phase flow to a position of the flowstream; and adjusting the variable restrictor of the needle-and-seat valve to achieve a desired pressure within the mobile phase flow.

The above aspect of the present technology can include one or more of the following features. For example, in one embodiment, both the mobile phase flow and the make-up flow comprise carbon dioxide. In other embodiments, the mobile phase flow includes carbon dioxide and the make-up flow includes a liquid solvent that is substantially absent of carbon dioxide (e.g., only trace amounts, such as amounts dissolved from atmosphere). In certain embodiments, the make-up flow includes methanol. In some embodiments, the method of operating the back pressure regulator having the needle-and-seat-valve further includes providing the mobile phase flow in a direction angled toward the variable restrictor. In embodiments, the mobile phase flow has a greater flow rate than the make-up flow.

Another aspect of the present technology is directed to a method of reducing sample band dispersion in a chromatography system, including providing a valve with a restrictor where the valve has a principal flowpath therethrough and an unswept volume, introducing a make-up flow to the valve such that the make-up flow occupies some or all of the unswept volume, thereafter allowing the make-up flow to travel through the principal flowpath and exit the valve passing through the restrictor, and introducing a mobile phase flow to the valve such that the mobile phase flow preferentially travels along the principal flowpath.

The above aspect of the present technology can include one or more of the following features. For example, in one embodiment, both the mobile phase flow and the make-up flow comprise carbon dioxide. In other embodiments, the mobile phase flow includes carbon dioxide and the make-up flow includes a liquid solvent that is substantially absent of carbon dioxide (e.g., only trace amounts, such as amounts dissolved from atmosphere). In certain embodiments, the make-up flow includes methanol. In embodiments, the mobile phase flow has a greater flow rate than the make-up flow.

Another aspect of the present technology is directed to a method for reducing band spreading of a chromatographic sample band associated with unswept volume, including: providing a make-up flow into a chamber at a make-up inlet, wherein at least a portion of the chamber is unswept volume before exiting the chamber at an outlet; providing a mobile phase flow into a chamber at a mobile phase inlet between the make-up inlet and the outlet; and permitting the mobile phase flow to exit the chamber.

Embodiments of the above aspects of the present technology may include one or more of the following features. For example, in one embodiment, both the mobile phase flow and the make-up flow comprise carbon dioxide. In other embodiments, the mobile phase flow includes carbon dioxide and the make-up flow includes a liquid solvent that is substantially absent of carbon dioxide (e.g., only trace amounts, such as amounts dissolved from atmosphere). In certain embodiments, the make-up flow includes methanol. In embodiments, the mobile phase flow has a greater flow rate than the make-up flow.

Another aspect of the present technology is directed to a configuration of a BPR to reduce exposure of the mobile phase flow to the interior volume of the BPR by minimizing internal volume of the BPR. Minimization occurs, in this aspect of the technology, by configuring the BPR to include at least one or more of the following attributes: (a) positioning an inlet point for the mobile phase flow immediately proximate a constriction point of the back pressure regulator, (b) positioning a seal proximate the inlet point distant from the constriction point, (c) positioning the inlet point such that mobile phase flow is introduced perpendicular to or angled toward a restrictor of the back pressure regulator, (d) positioning an outlet receptor immediately proximate and downstream from the constriction point; or (e) reducing cross-sectional area at interfaces between back pressure regulator components. As an example, one way to achieve a BPR with reduced internal volume is to provide a BPR with a configuration that meets each of attribute (a)-(e) listed above. In one embodiment, a redesigned seat, such as a seat that is decoupled from a securing mechanism can be utilized. For example, by redesigning the seat to be press-fit into a housing leading to the outlet, savings in internal volume can be achieved. That is, the seat and housing are connected via a rotatably decoupled connection allowing the housing to be tightly secured (i.e., pressurizable connection) with minimal seal fluid volume. Other advantages of such a seat redesign include robustness and multiple uses and replacement as the seat is decoupled from the securement mechanism (e.g., nut) which is forcefully secured (under torque) to create the proper pressurized environment.

In one aspect the present technology is directed to a method of installing a seat into a back pressure regulator (e.g., installing a seat that is rotatably decoupled from a securement mechanism (e.g., nut) to allow for reduced internal fluid volumes). The method includes: press-fitting the seat into a housing connectable to an outlet of the back pressure regulator; sliding a threaded nut over the housing; crimping an end of the nut to the housing to provide a rotatably decoupled connection between the housing and the nut that allows the nut to freely rotate about the seat; and securing the nut to a head of the back pressure regulator, the head including a fluid inlet and a needle, wherein due to the rotatably decoupled connection securement of the nut creates a pressure tight seal between the outlet and the head via rotation of the nut without applying torque to the seat.

BPRs are often used in chromatography systems using a highly compressible fluid (e.g. $CO_2$) as the mobile phase, sometimes referred to as supercritical fluid chromatography or $CO_2$-based chromatography, because of their robustness and for cost-effective pressure control with high precision. As a result, some embodiments described herein are particularly directed to highly compressible fluid chromatography systems or $CO_2$-based chromatography systems. However, the present technology may be used for BPRs in other chromatography systems.

The present technology has numerous advantages. For example, the technology improves the quality of separation and detection. Fluidic modeling and chromatographic experiment disclosed herein have shown that the present technology provides significant reduction in extra-column band broadening. See Examples described herein. As a result, embodiments have been shown to yield sharper and more symmetrical chromatogram peaks. See Examples 2 and 4.

Further advantages include greater flexibility as to the detector types which may be used while still retaining good separation quality, which may in turn increase the type of samples applicable for use in the system. Also, the present technology permits greater flexibility in the design of the back pressure regulator by providing an alternative or addition to merely reducing the volume of the BPR. Further, some embodiments of the technology provide increased robustness and usability of the BPR as the components (e.g., seat) can be tailored to and installed using a method which decreases torque stress, shear and wear of the seat.

BRIEF DESCRIPTION OF THE DRAWINGS

The invention may be more fully understood from the following detailed description taken in conjunction with the accompanying drawings.

FIG. 16 is an enlarged schematic illustration of a needle-and-seat type back pressure regulator with reduced internal volume.

DETAILED DESCRIPTION

Figure 1:
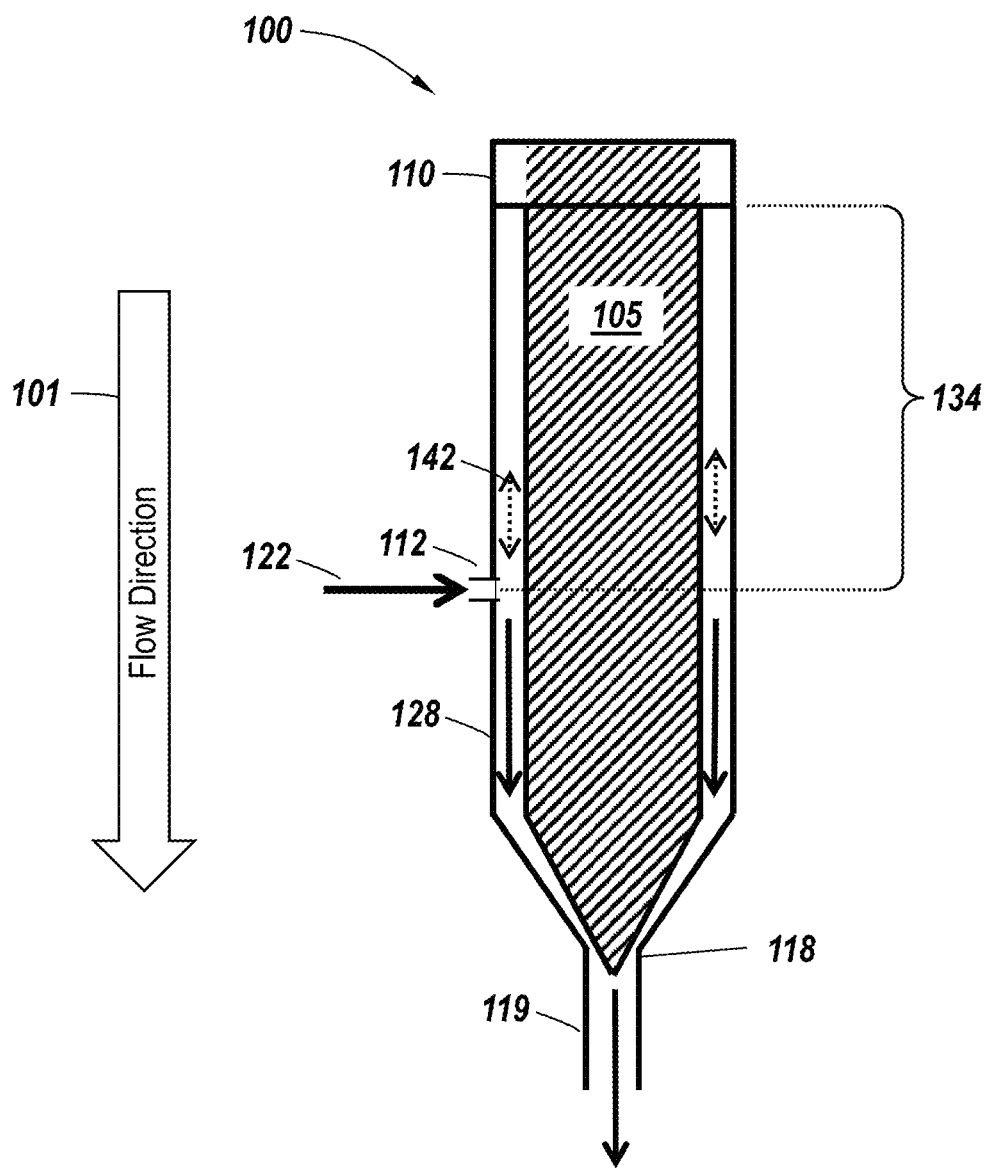
FIG. 1 illustrates a conventional needle-and-seat type back pressure regulator.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

In general, aspects of the present technology are directed to reducing or minimizing chromatographic band distortion in systems containing a back pressure regulator (BPR) positioned between a column and a detector (i.e., BPR interface flow design). Some of the apparatus and methods described herein have been configured or especially tailored to reduced chromatographic band distortion. For example, in some embodiments, internal volume of a BPR has been tailored such that unswept volume is minimized. In an embodiment, a make-up flow is provided to the BPR such that solvent flow is unable to diffuse into and out of unswept volume of the BPR. Alternatively or additionally, relationships and placement or positioning of various BPR components are configured to reduce internal volume by at least about 20% (e.g., 35%, 30%, 35%, 40%, 44%, 45%, 50%, 53%, 55%, 60%) over standard or commercially available BPRs. As a result of decreasing the internal volume, the amount of unswept volume is also reduced and thus minimizes band distortion effects.

One aspect of the present technology is directed to a back pressure regulator including a channel, a mobile phase inlet within the channel and in fluid communication with a mobile phase source, a make-up flow inlet within the channel and in fluid communication with a make-up flow source (where the mobile phase inlet and the make-up flow inlet are disposed to create an offset such that the make-up flow inlet is upstream of the mobile phase inlet), and a variable restrictor in or in communication with the channel and configured to control fluid flow exiting the channel. In an embodiment, the mobile phase inlet is angled toward the variable restrictor. In an embodiment, the mobile phase inlet is placed immediately upstream of the variable restrictor.

The present technology may significantly reduce or eliminate extra-column band broadening associated with a BPR. Two closely related, but distinct volumes contribute to the broadening discussed herein. Extra-column volume generally refers to any additional volume added within the system which is to be traversed by the mobile phase flow. For example, the use of longer tubing or tubing with a larger diameter within the system would increase the amount of extra-column volume. The volume of the back pressure regulator through which the mobile phases flows contributes extra-column volume. Unswept volume refers to a volume within the system which is accessible to the flowstream, but which, due to the geometry of the system, is not within the main portion of the flowstream itself. That is to say, a "backwater" of the system. The unswept volume contributes to band broadening in that some portion of the sample band may diffuse into the unswept portion and be retained there for some period. As the retained portion of the sample band may eventually rejoin the main portion of the flowstream the sample band is broadened. In systems provides with a make-up flow, the make-up flow may channel the mobile phase through the BPR, bypassing portions of the interior volume of the BPR, and reducing the interior volume accessed by the mobile phase.

In embodiments where the BPR is configured to have a reduced interior volume, a number of modifications may be used to achieve the reduced volume. For example, head volume between the inlet and the restriction point, such as surrounding the needle and between the seat and seal; seat volume within the seat itself; and outlet volume downstream of the seat and leading to the outlet. Volume may be reduced by, for example, targeting the inlet directly to the needle (e.g. perpendicular to the needle) and closer to the valve seat; by reducing the length of the seat, by configuring the seat to have an interior shape approximating that of the needle, or by reducing the cross-sectional area at interfaces between the components to approximate the same area as the flowpath throughout. In embodiments, each of these modifications may be used alone or any combination of the modifications may be used.

The variable restrictor is the point within the BPR at which the area of the flowstream may be adjusted in order to modify the solvent flow and to control pressure. For example, as shown in FIG. 1, needle-and-seat valve 100 shows variable restriction 118 formed by channel 119 and needle 105. As needle 105 moves farther into channel 119, the area at variable restrictor 118 will decrease, whereas if the needle moves out of channel 119 the area will increase.

The present technology relates to a needle-valve-type back pressure regulator including a valve seat having an axial passageway therethrough, a needle (having a tip and a shaft and the needle positioned parallel to the axial passageway of the valve seat and having a range of motion in a direction parallel to the axial passageway such that at one extreme of the range of motion the tip is seated within the axial passageway), a channel positioned adjacent to the valve seat through which at least a position of the needle moves along its range of motion, a headspace constituting a void defined by the unoccupied portions of the axial passageway and the channel, a mobile phase inlet with the headspace, and a make-up flow inlet within the headspace. The mobile phase inlet and the make-up flow inlet are located at two different and distinct positions within the headspace.

The needle-valve-type back pressure regulator may include a drive mechanism in communication with the needle to determine the position of the needle within its range of motion. The mobile phase inlet may be between the make-up flow inlet and the valve seat. The valve seat may comprise a restriction located such that the tip is seated against the restriction at one extreme of the range of motion. The mobile phase inlet and the make-up flow inlet may be approximately perpendicular to the axial passageway. In some embodiments, the relationship between the mobile phase inlet and the make-up flow inlet may be about 0, 10, 20, 30, 40, 50, 60, 70, 80, 90, 100, 110, 120, 130, 140, 150, 160, 170, or 180 degrees. The mobile phase inlet may be angled toward the valve seat and the make-up flow inlet may be approximately perpendicular to the axial passageway. The mobile phase inlet and the make-up flow inlet may both be angled toward the valve seat. The mobile phase inlet and the make-up flow inlet may be offset from each other such that a projection of each on a plane perpendicular to the axial passageway forms an angle of approximately 120 degrees. In some embodiments, the angle may be about 0, 10, 20, 30, 40, 50, 60, 70, 80, 90, 100, 110, 120, 130, 140, 150, 160, 170, or 180 degrees. The mobile phase inlet may be located as near as practicable to the restriction.

The present technology also relates to a method of operating a back pressure regulator having a needle-and-seat valve including providing a make-up flow to an interior volume of the needle-and-seat valve at a make-up flow inlet; flowing the make-up flow through at least a portion of the interior volume and through a variable restrictor of the needle-and-seat valve to create a flowstream; introducing a mobile phase flow to a position of the flowstream; and adjusting the variable restrictor of the needle-and-seat valve to achieve a desired pressure within the mobile phase flow. The mobile phase flow and the make-up flow may each include carbon dioxide. The mobile phase may include carbon dioxide and the make-up flow may include a liquid solvent and be substantially absent carbon dioxide. When a given flowstream is substantially absent carbon dioxide, the flowstream may have some trace amount of carbon dioxide, for example a trace amount of carbon dioxide which has been dissolved in a liquid solvent from exposure to the air. The mark-up flow may include methanol. The mobile phase flow may be in a direction angled toward the variable restrictor. The mobile phase flow may have a greater flow rate than the make-up flow.

The present technology further relates to a method of reducing sample band dispersion in a chromatography system, including providing a valve with a restrictor where the valve has a principal flowpath therethrough and an unswept volume, introducing a make-up flow to the valve such that the make-up flow occupies some or all of the unswept volume, thereafter allowing the make-up flow to travel through the principal flowpath and exit the valve passing through the restrictor, and introducing a mobile phase flow to the valve such that the mobile phase flow preferentially travels along the principal flowpath. The mobile phase flow and the make-up flow may each include carbon dioxide. The mobile phase may include carbon dioxide and the make-up flow may include a liquid solvent and be substantially absent carbon dioxide. The make-up flow may include methanol. The mobile phase flow may have a greater flow rate than the make-up flow.

The present technology also relates to a method for reducing band spreading of a chromatographic sample band associated with unswept volume, including: providing a make-up flow into a chamber at a make-up inlet, wherein at least a portion of the chamber is unswept volume before exiting the chamber at an outlet; providing a mobile phase flow into a chamber at a mobile phase inlet between the make-up inlet and the outlet; and permitting the mobile phase flow to exit the chamber. The mobile phase flow and the make-up flow may each include carbon dioxide. The mobile phase may include carbon dioxide, and the make-up flow may include a liquid solvent and be substantially absent carbon dioxide. The make-up flow may include methanol. The mobile phase flow may have a greater flow rate than the make-up flow.

Introducing a make-up flow as disclosed will cause some dilution of the sample. However, as the volume of the make-up flow may be small, the degree of dilution may be minimal. It may be appreciated that the flowrate may be kept relatively low and still a pressure be maintained to control mobile phase diffusion. Further, and especially, when using a detector with a low limit of quantitation, the dilution may be much less significant than the advantage gained by reducing sample band broadening. In particular, separations of close eluting samples may benefit from the reduction or elimination of overlap between sample elution.

In an embodiment, the mobile phase flow has a greater flow rate than the make-up flow. For example, the mobile phase flow rate may be 110%, 120%, 130%, 140%, 150%, 160%, 170%, 180%, 190%, 200%, 225%, 250%, 275%, 300%, 350%, 400%, 450%, 500%, 750% or 1000% the make-up flow rate. The flow rate may be measured as volume per unit time. For example, the mobile phase flow rate may be 1.5 mL/min, while the make-up flow rate may be 0.1 mL/min. In certain embodiments, the mobile phase flow rate is between about 0.5 to 4 mL/min, and the make-up flow rate is between about 0.05 to 0.1 mL/min. The selection of a make-up flow rate that is significantly smaller than the mobile phase flow rate may minimize dilution.

Embodiments of this disclosure may be particularly relevant to chromatography systems that use detectors that operate at a lower pressure than the columns.

In systems where the detector is capable of operating at high pressure, the detector may be positioned before the back pressure regulator, minimizing the problem of band broadening in the back pressure regulator. Conversely, in a system in which the detector will be positioned within the low pressure portion of the system, the detector will be positioned downstream of the back pressure regulator. In such a system, additional back pressure regulator may contribute extra column band broadening, thus representing a particularly good application for the present disclosure.

As described in the foregoing embodiments, the make-up flow and the mobile phase flow may include different components, or may include similar components. For example, both the make-up flow and the mobile phase flow may be carbon dioxide-based, they may be based upon a combination of carbon dioxide and liquid co-solvent, or may be based upon carbon dioxide, liquid co-solvent, and solutes. A common co-solvent is methanol. Examples of other co-solvents include acetonitrile, methylene chloride, tetrahydrofuran, methyl t-butyl ether, and other alcohols such as ethanol and isopropanol. The solutes may include, for example, pH modifiers. "Liquid solvents" refers to solvents with are liquid at standard temperature and pressure. It will be understood by one of ordinary skill in the art that at different temperatures and pressures these materials will exist in other phases. Liquid solvents include e.g., organic solvents, inorganic solvents, and water.

The present technology may be applied to a number of valves where the valve tends to exhibit some portion of unswept volume, for example, needle valves, poppet valve, diaphragm valve, angle valves, and globe valves.

FIG. 1 shows a needle-and-seat valve 100 that does not include the present technology. During the operation of needle-and-seat valve 100, mobile phase flowstream 122 is introduced into the valve at mobile phase inlet 112. Preferably, mobile phase flowstream 122 will flow through restriction 118 and channel 119 and exit the valve following direction of flow 101. However, needle-and-seat valve 100 has unswept volume 134, the area between mobile phase inlet 112 and seal 110 surrounding needle 105. As shown, some portion of mobile phase flowstream 122 may tend to diffuse into unswept volume 134 as indicated by flowstream 142. Flowstream 142 represents mobile phase which flows into and out of unswept volume 134. As flowstream 142 moves back into and mixes with newly added mobile phase in flowstream 122 the resulting flowstream 128 will exhibit sample band broadening.

Figure 2:
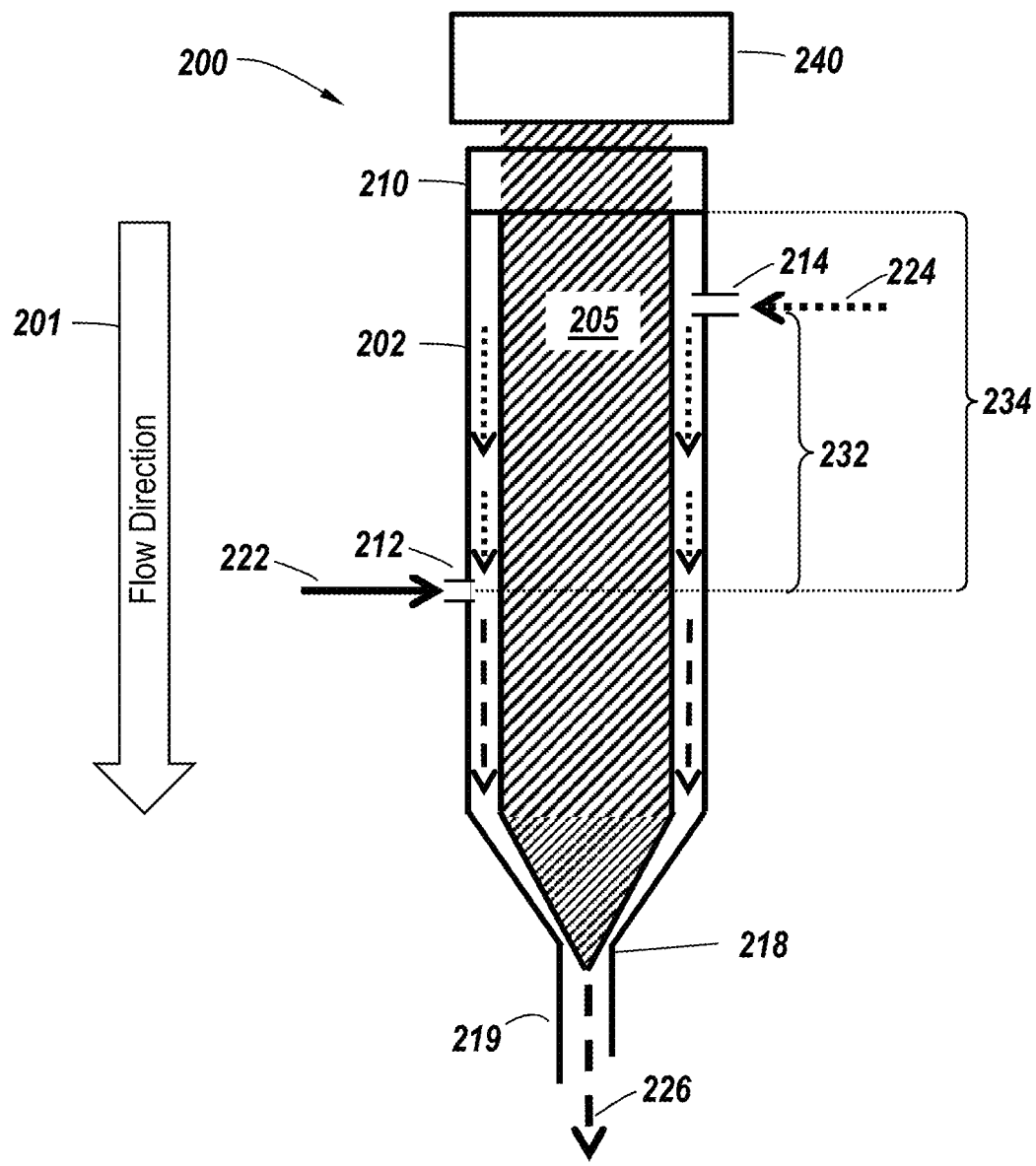
FIG. 2 illustrates a needle-and-seat type back pressure regulator with a make-up flow source.

FIG. 2 shows needle-and-seat valve 200 according to the present technology which has mobile phase inlet 212, seal 210, and needle 205. Channel 219 and needle 205 form variable restrictor 218. The movement of needle 205 changes the opening area of variable restrictor 218. Unswept volume 234 forms the portion of interior volume between mobile-phase inlet 222 and seal 210. As shown in FIG. 2, when make-up flowstream 224 is introduced into needle-and-seat valve 200 at make-up inlet 214, it occupies unswept volume 234 as flowstream 202. When flowstream 202 occupies the unswept volume 234, the tendency for mobile phase flowstream 222 to diffuse into unswept volume 234 is reduced, as compared to the flowstream depicted in FIG. 1 as flowstream 142. As a result, mobile phase flowstream 222 passes through needle-and-seat valve 200 substantially along flow direction 201 without mixing and diffusion, and exits channel 219, with minimum spreading, as flowstream 226.

FIG. 2 additionally depicts drive mechanism 240. Drive mechanism 240 may be any type of drive mechanism suitable for controllably moving needle 205 and thereby operating variable restrictor 218. For example, drive mechanism 240 may be a solenoid, servo motor, pneumatic drive, hydraulic drive, or screw mechanism.

The space between mobile phase inlet 212 and make-up inlet 214 is designated as offset 232. In embodiments, the offset may be reduced. For example, though needle-and-seat valve 200 shows a significant offset 232, in other embodiments, make-up inlet 214 and mobile phase inlet 212 may be in closer proximity.

Figure 3:
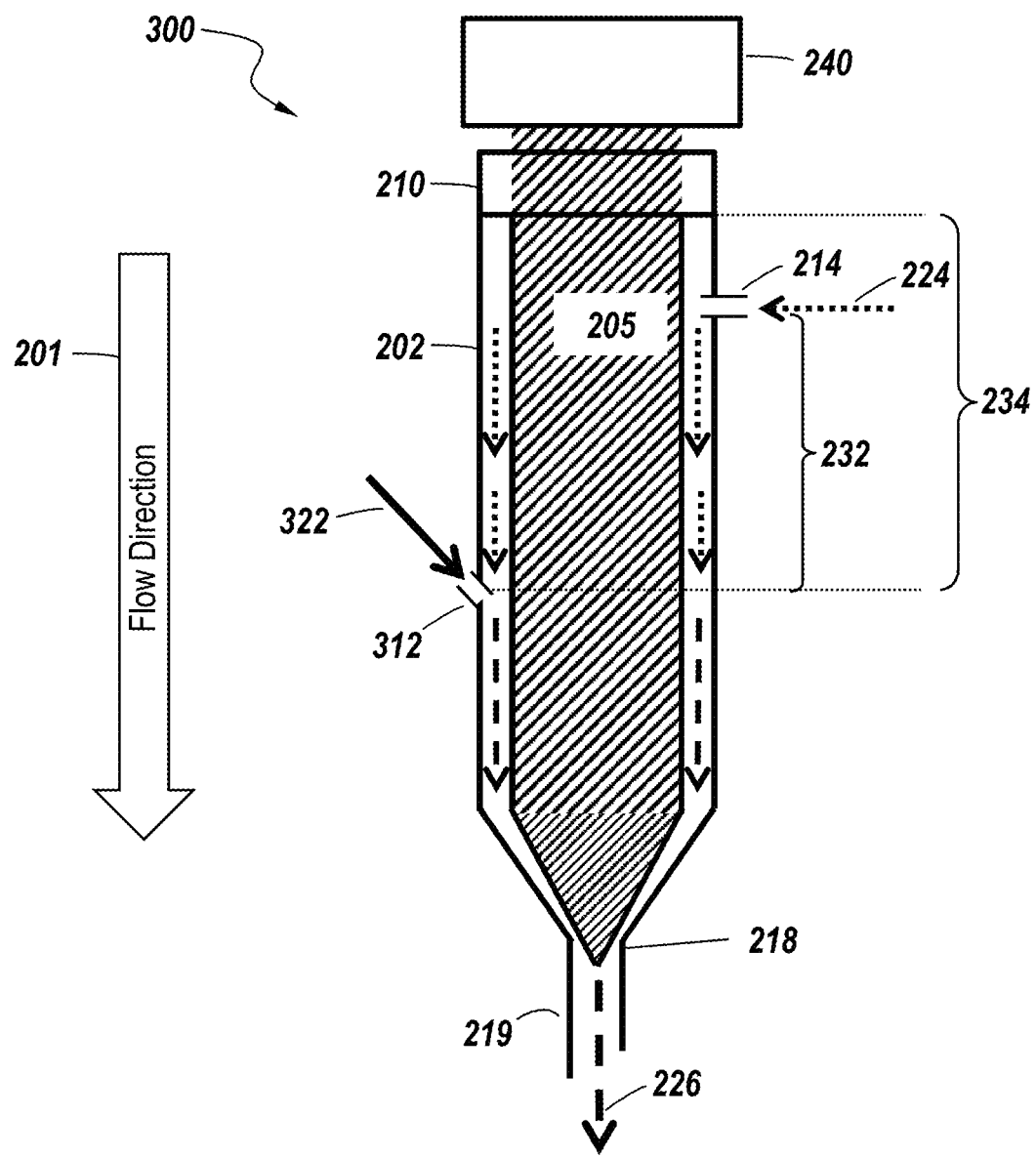
FIG. 3 illustrates a needle-and-seat type back pressure regulator with a make-up flow source.

FIG. 3 shows another embodiment of a needle-and-seat valve 300, in which mobile phase flowstream 322 is introduced through angled mobile phase inlet 312 which is angled away from unswept volume 234 and toward variable restrictor 218. The angled mobile phase inlet 312 directs mobile phase flowstream 322 toward variable restrictor 218 and channel 219. Use of an angled mobile phase introduction point may further reduce the tendency of the mobile phase to diffuse into the unswept volume, here depicted as unswept volume 234.

Figure 4:
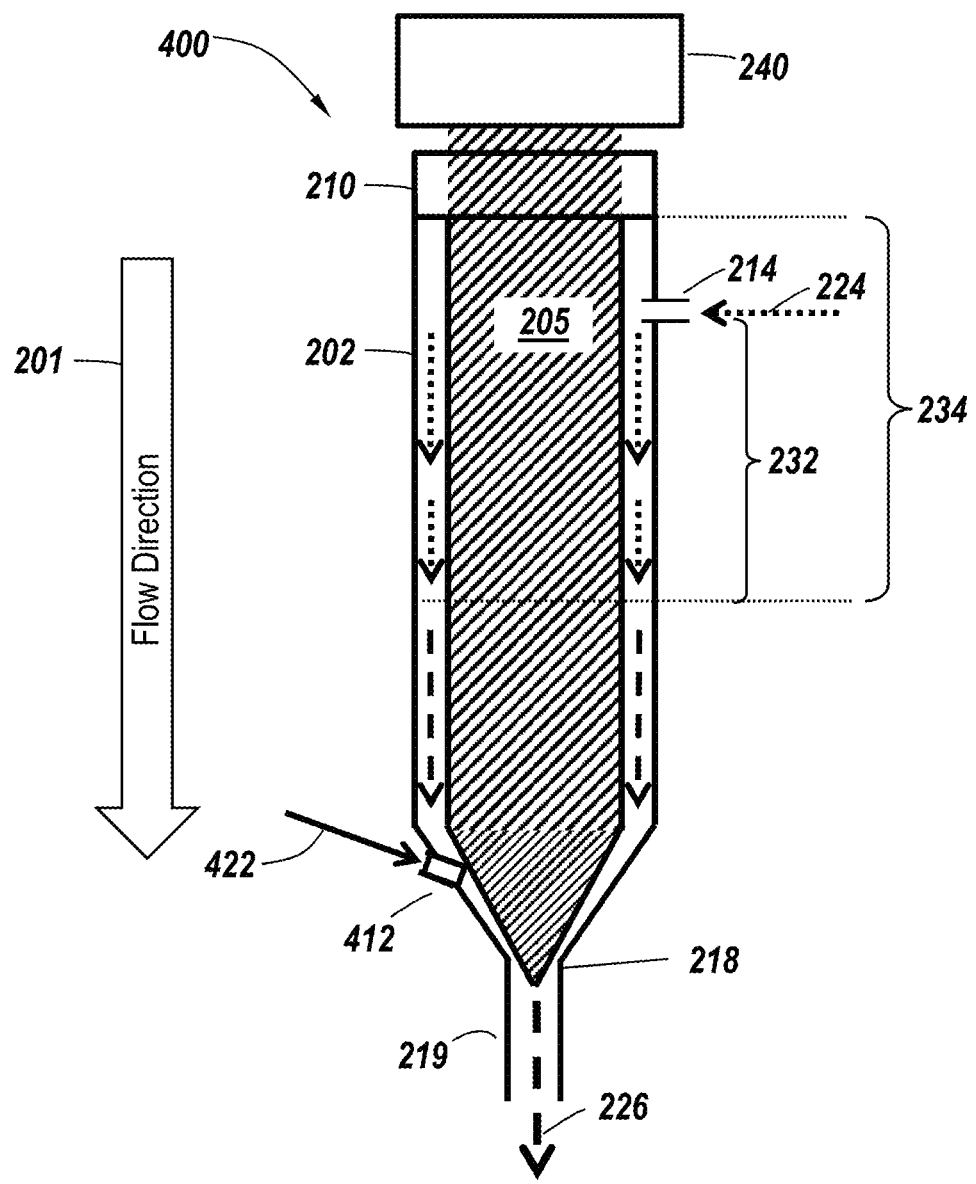
FIG. 4 illustrates a needle-and-seat type back pressure regulator with a make-up flow source.

FIG. 4 shows another embodiment of a needle-and-seat valve 400, an embodiment in which mobile phase flowstream 422 is introduced through angled mobile phase inlet 412 which is angled away from unswept volume 234 and toward variable restrictor 218. Further, mobile phase inlet 412 is placed close to variable restrictor 218. This orientation may be used to further the preferential delivery of mobile phase flowstream 422 through channel 219 with a minimum of diffusion into unswept volume 234.

Figure 5A:
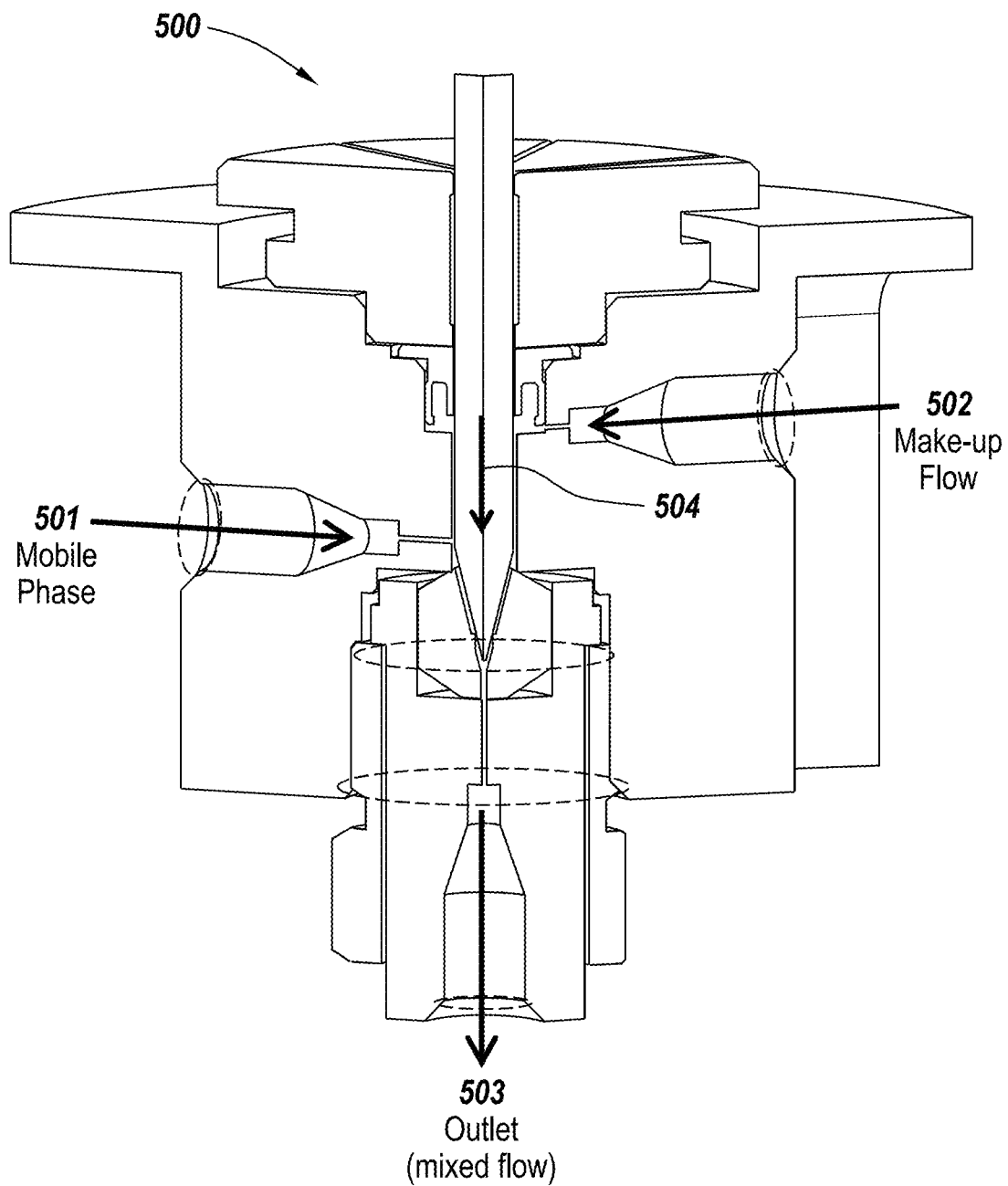
FIG. 5A illustrates a needle-and-seat type back pressure regulator with a make-up flow source.
Figure 5B:
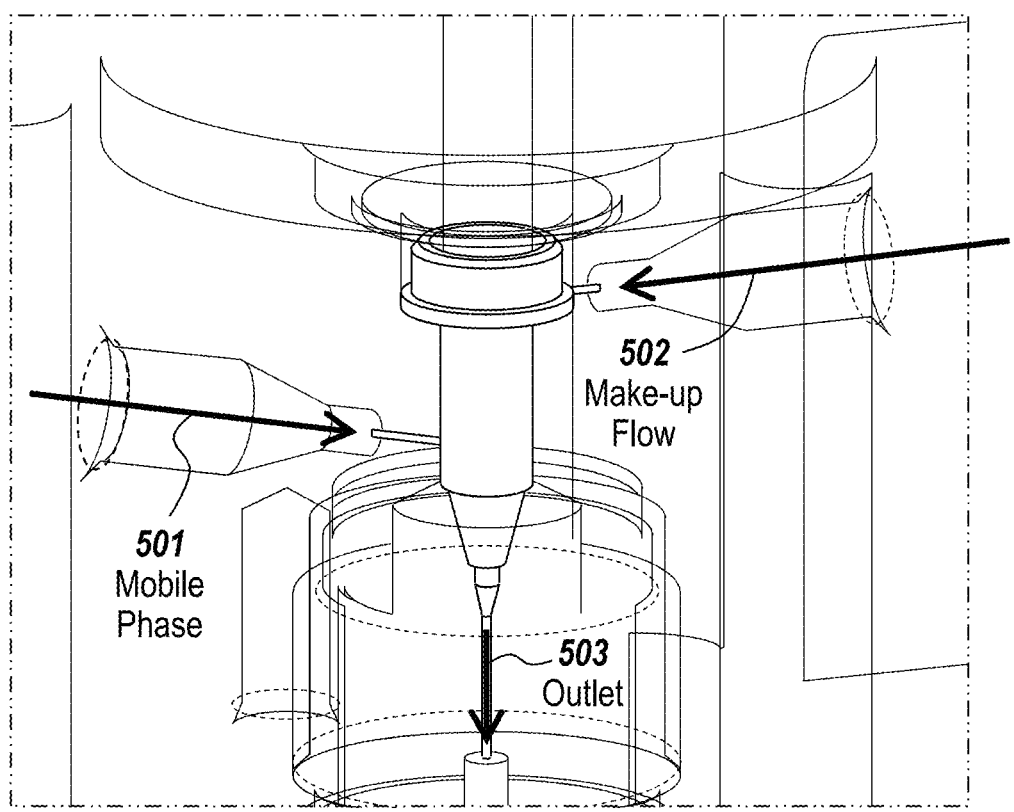
FIG. 5B illustrates an enlargement of a needle-and-seat type back pressure regulator with a make-up flow source.

FIG. 5A shows a needle-and-seat valve where mobile phase 501 is introduced perpendicular to make-up flow 502 and with a relatively large offset between the mobile phase 501 and make-up flow 502. That is, make-up flow 502 enters valve 500 through an inlet and enters flow path 504 upstream of the mobile phase flow 501 (i.e., at the distance equal to the offset). Mobile phase 501 is introduced perpendicular to flow path 504, at a location where the flowpath 504 currently only contains make-up flow (i.e., prior to introduction and combination of mobile phase). The combined flowstream is released at outlet 503. FIG. 5B shows an enlargement of a section of the valve shown in FIG. 5A.

Figure 6A:
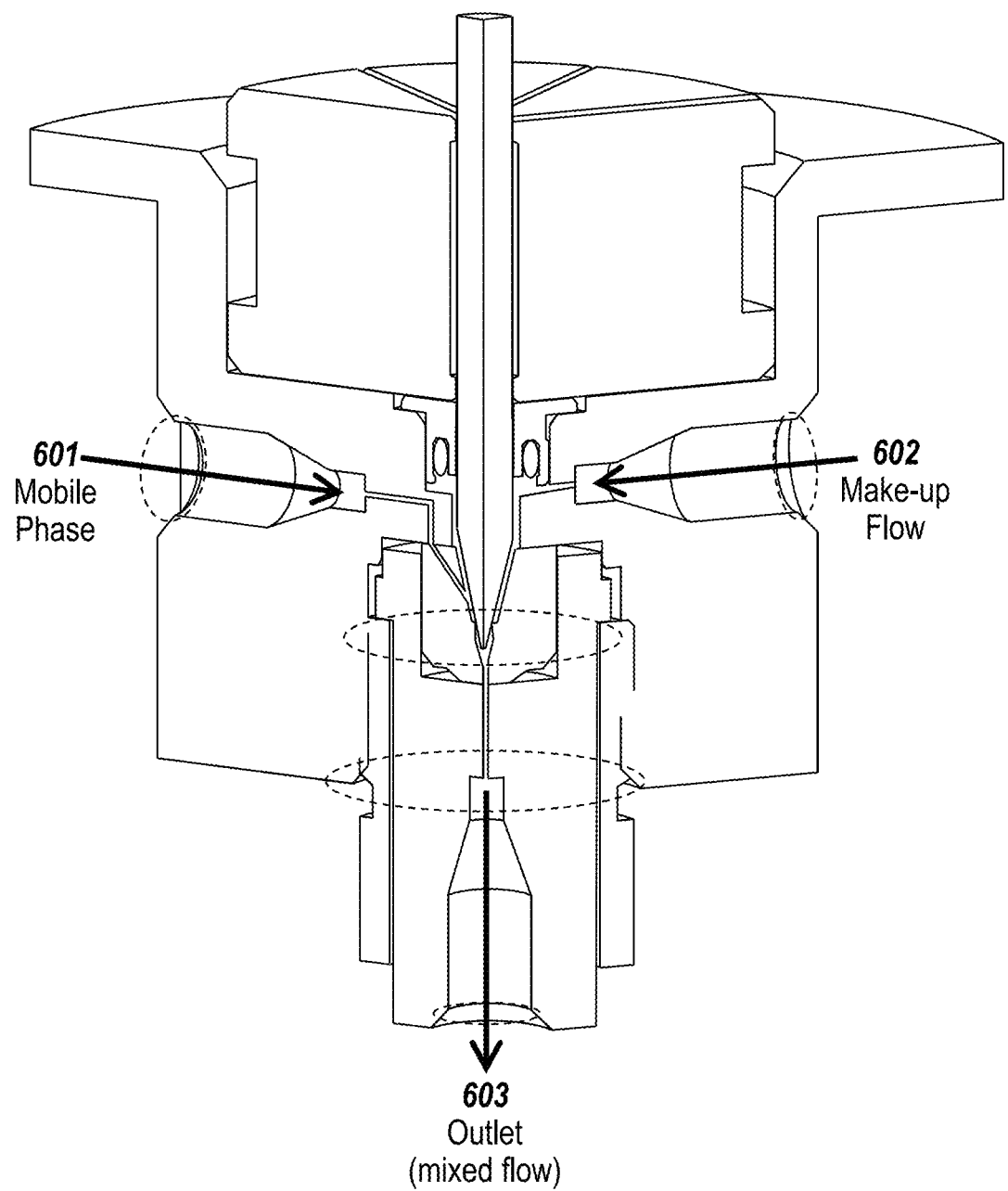
FIG. 6A illustrates a needle-and-seat type back pressure regulator with a make-up flow source.
Figure 6B:
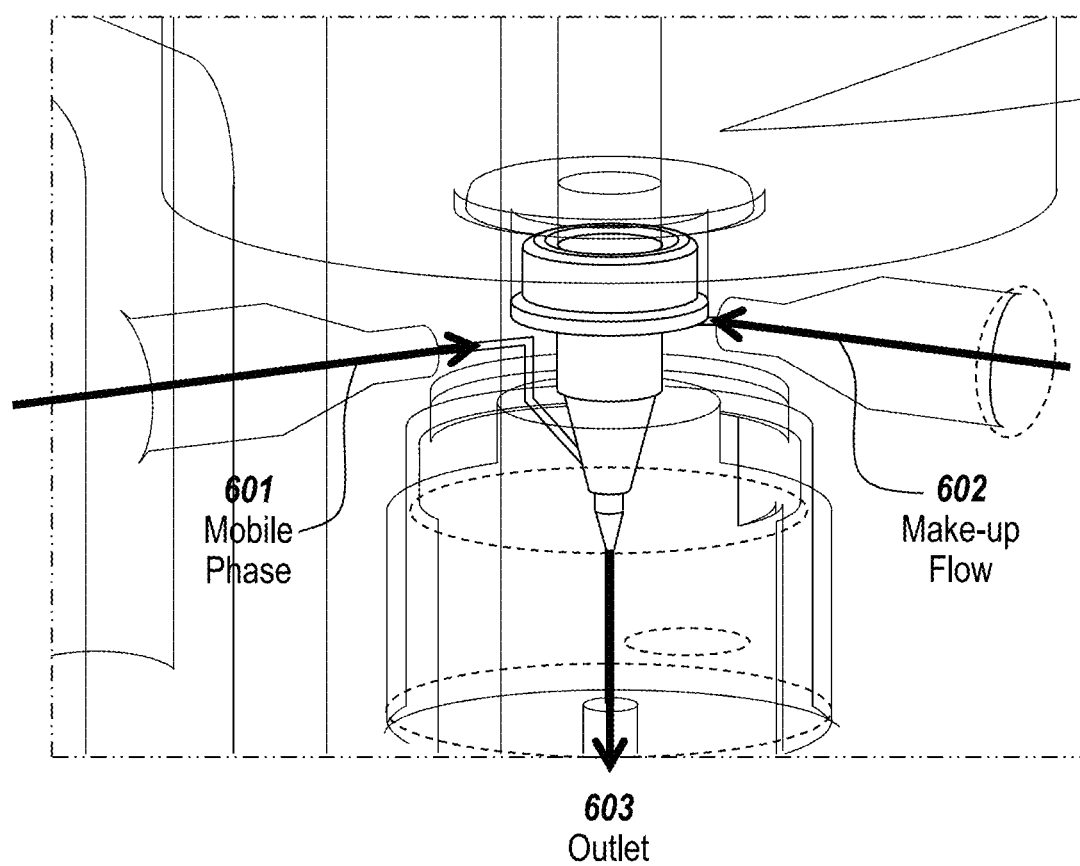
FIG. 6B illustrates an enlargement of a needle-and-seat type back pressure regulator with a make-up flow source.

FIG. 6A shows a needle-and-seat valve where mobile phase 601 is introduced near the restriction point with a short offset from make-up flow 602. The combined flowstream is released at outlet 603. FIG. 6B shows an enlargement of a section of the valve shown in FIG. 6A.

Figure 7:
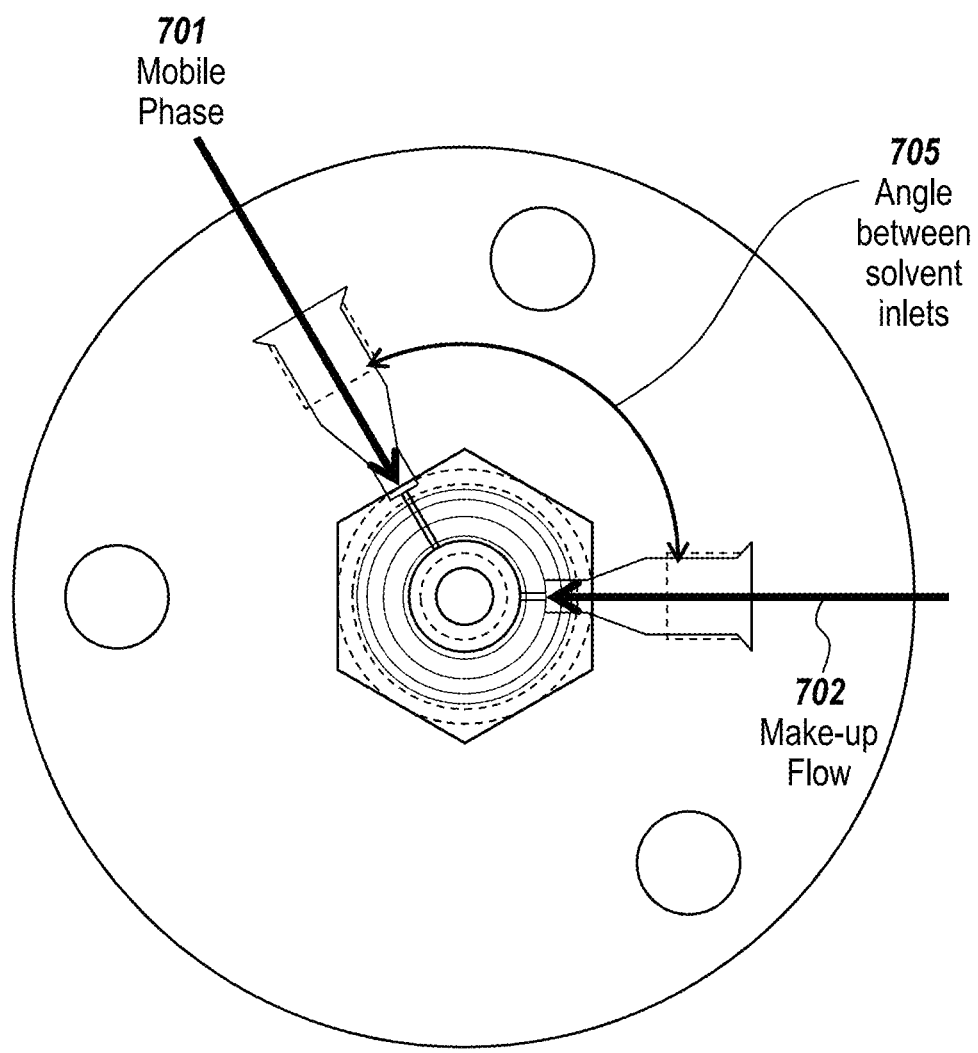
FIG. 7 illustrates a needle-and-seat type back pressure regulator with a make-up flow source viewed along the axis of the needle.

FIG. 7 shows a needle-and-seat valve viewed along the axis of the needle. The points at which mobile phase 701 and make-up flow 702 are introduced are separated by angle 705. In other words, mobile phase 701 and make-up flow 702 are offset from each other such that a projection of each on a plane perpendicular to the axial passageway forms an angle of approximately 120 degrees.

Figure 8:
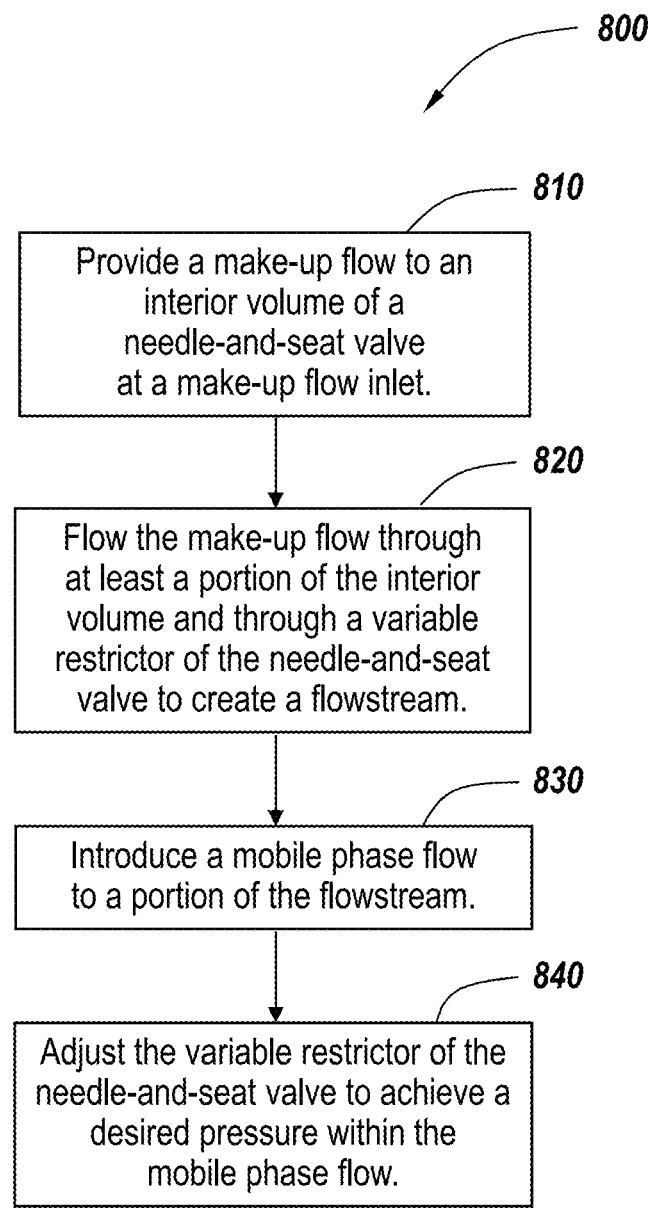
FIG. 8 schematically illustrates a method of operating a back-press-regulator according to an embodiment of the present technology.

FIG. 8 schematically illustrates method 800 for operating a back pressure regulator according to an embodiment of the present technology. Step 810 calls for providing a make-up flow to an interior volume of a needle-and-seat valve at a make-up flow inlet. Step 820 calls for flowing the make-up flow through at least a portion of the interior volume and through a variable restrictor of the needle-and-seat valve to create a flowstream. Step 830 calls for introducing a mobile phase flow to a portion of the flowstream. Step 840 calls for adjusting the variable restrictor of the needle-and-seat valve to achieve a desired pressure within the mobile phase flow.

Figure 9:
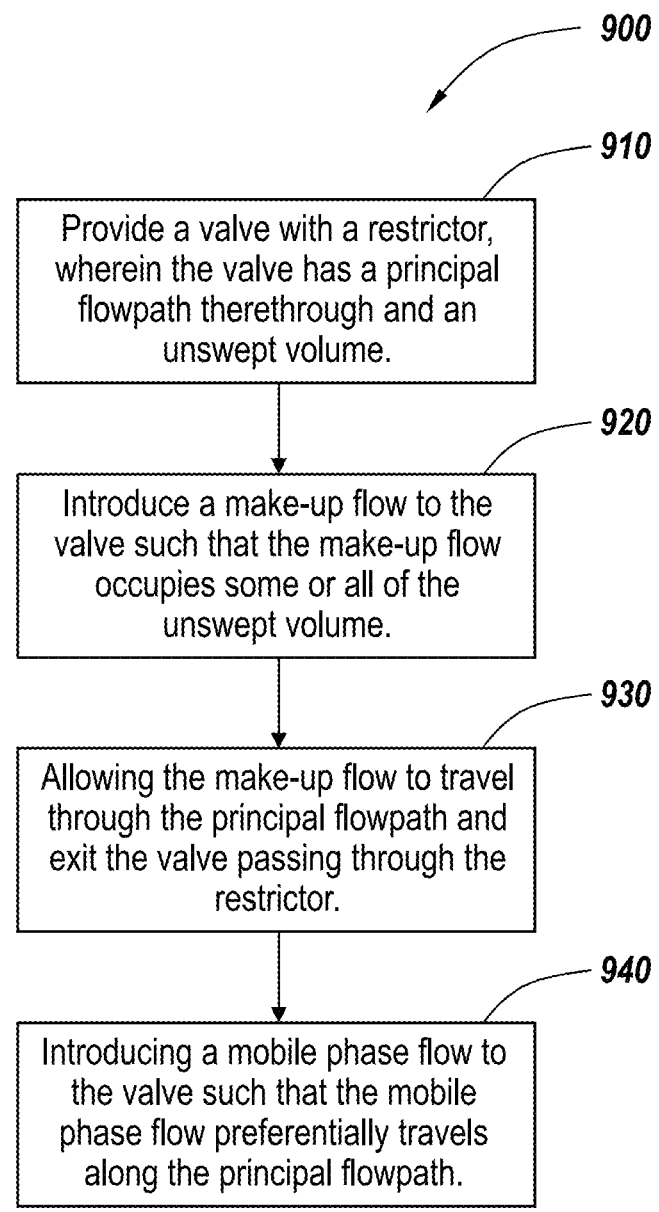
FIG. 9 schematically illustrates a method of operating a back-press-regulator according to an embodiment of the present technology.

While embodiments of the present technology may include a needle-and-seat type valve, as set forth in method 800 and in, e.g., FIG. 2, the present technology may also be used with other valve types. FIG. 9 schematically illustrates method 900 for operating a valve according to an embodiment of the present technology. The valve may be any type of valve having an unswept volume, such that make-up solvent flow introduced to the valve as described herein will preferentially occupy that unswept volume and reduce the degree of diffusion of the mobile phase flow into the unswept volume. For example, in addition to needle-and-seat valves, the valve may be a poppet valve, a diaphragm valve, an angle valve, or a globe valve. Step 910 calls for providing a valve with a restrictor, wherein the valve has a principal flowpath therethrough and an unswept volume. Step 920 calls for introducing a make-up flow to the valve such that the make-up flow occupies some or all of the unswept volume. Step 930 calls for allowing the make-up flow to travel through the principal flowpath and exit the valve passing through the restrictor. Step 940 calls for introducing a mobile phase flow to the valve such that the mobile phase flow preferentially travels along the principal flowpath.

Figure 10:
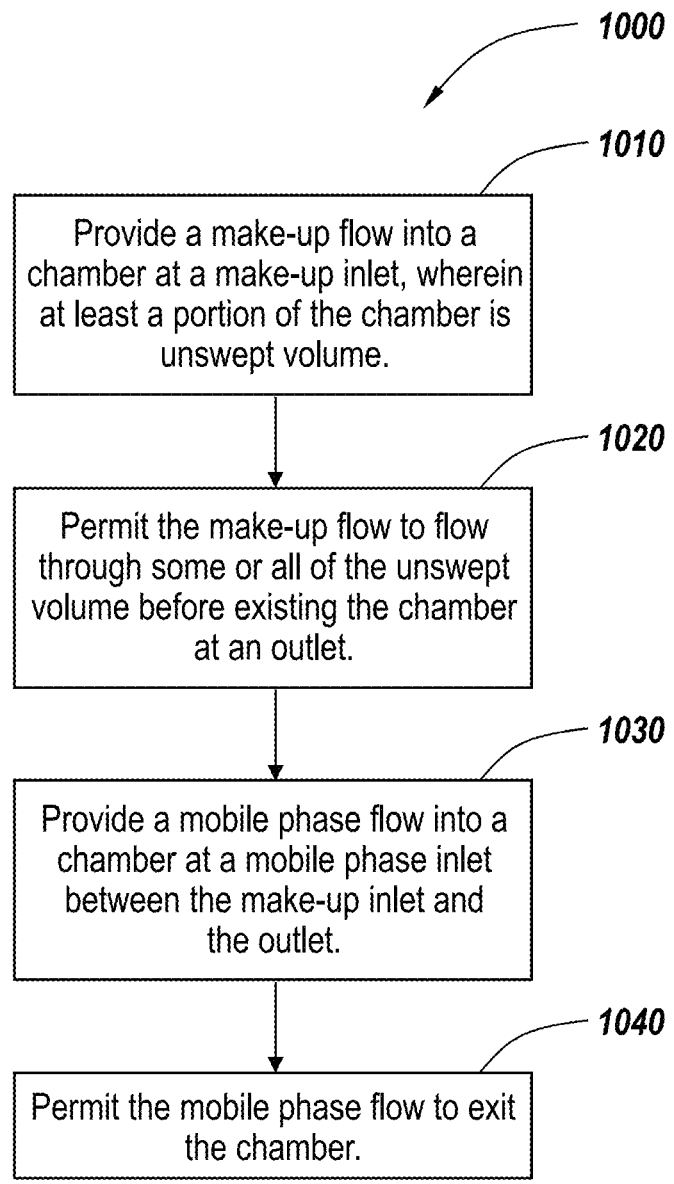
FIG. 10 schematically illustrates a method of operating a back-press-regulator according to an embodiment of the present technology.

The present technology, in addition to applicability in a range of valves, may also be used in other system components exhibiting an unswept volume. Applying the technology may reduce mobile phase diffusion into the unswept volume by preferentially filling the unswept volume with make-up flow. By preferentially filling the unswept volume, the make-up flow fills a greater portion of the unswept volume than does the mobile phase flow and the mobile phase flow fills relatively less of the unswept volume than either of the make-up flow or the mobile phase flow in the absence of the make-up flow. Applying the present technology to system components upstream of the detector may reduce peak spreading, tailing, etc. on the chromatogram associated with extra column band broadening. For a preparatory system, the technology could be applied at any point upstream of sample collection in order to maintain separation quality to the point of fraction collection. FIG. 10 schematically illustrates method 1000 for operating a back pressure regulator according to an embodiment of the present technology. Step 1010 calls for providing a make-up flow into a chamber at a make-up flow inlet, wherein at least a portion of the chamber is unswept volume. Step 1020 calls for permitting the make-up flow to flow through some or all of the unswept volume before exiting the chamber at an outlet. Step 1030 calls for providing a mobile phase flow into a chamber at a mobile phase inlet between the make-up inlet and the outlet. Step 1040 calls for permitting the mobile phase flow to exit the chamber. As discussed above, method 1000 may be applied to various chambers within a chromatography system, including a BPR, but also including other chambers that have a portion of unoccupied volume. In particular, chambers upstream of the detector or sample collection apparatus of the system may be particularly well-suited for application of method 1000 in order to reduce band spreading associated with the extra column volume of the chamber that would reduce the quality of the separation or collection.

Any of methods 800, 900, and 1000 may be performed such that the mobile phase flow and the make-up flow each include carbon dioxide, or so that the mobile phase includes carbon dioxide and the make-up flow includes a liquid solvent and is substantially absent carbon dioxide, or so that the make-up flow includes methanol. Further, methods 800, 900, and 1000 may be performed such that the mobile phase has a greater flow rate than the make-up flow.

EXAMPLE 1

Figure 11A:
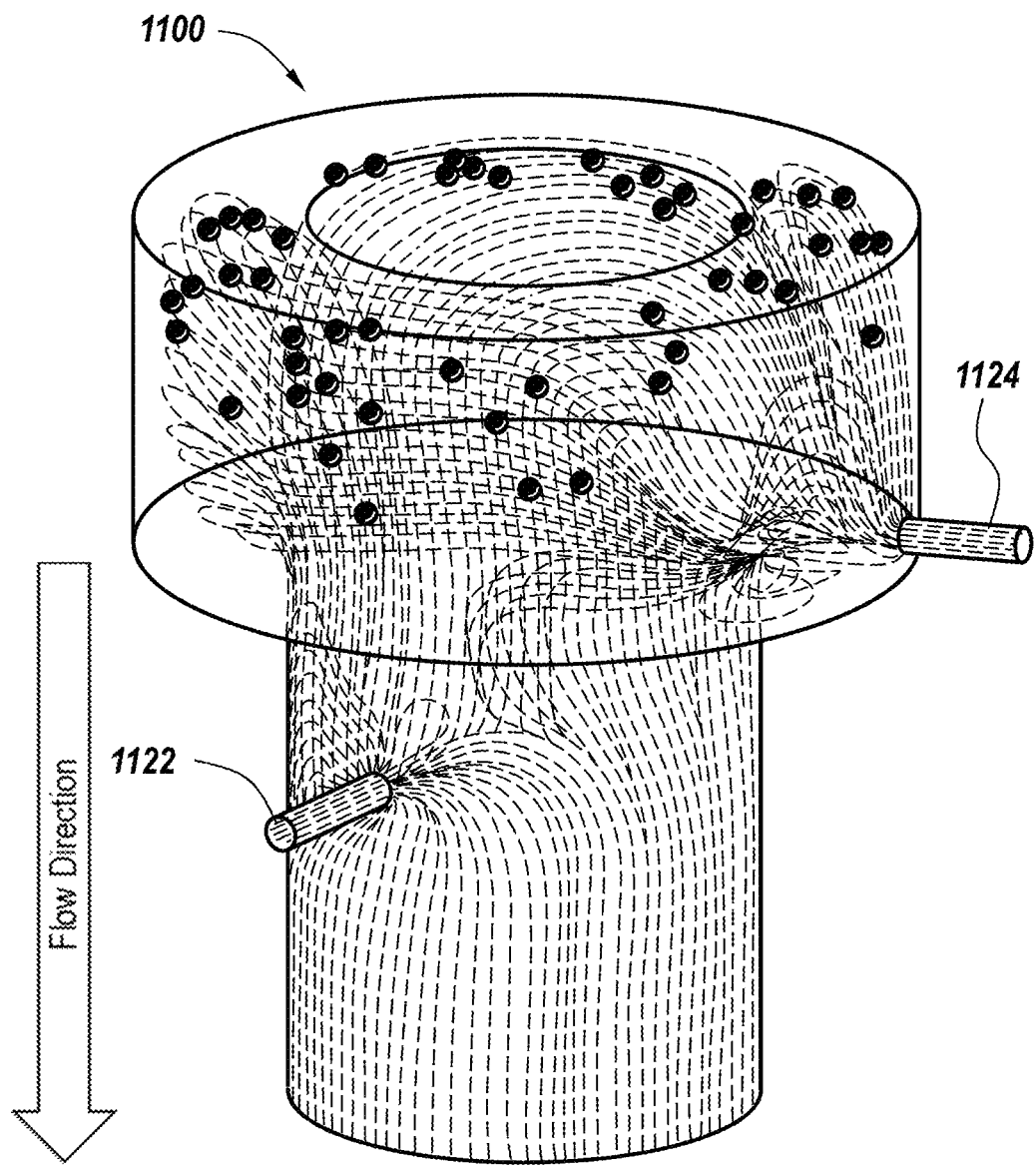
FIG. 11A represents a fluidic modeling diagram for a back pressure regulator with a make-up flow source.
Figure 11B:
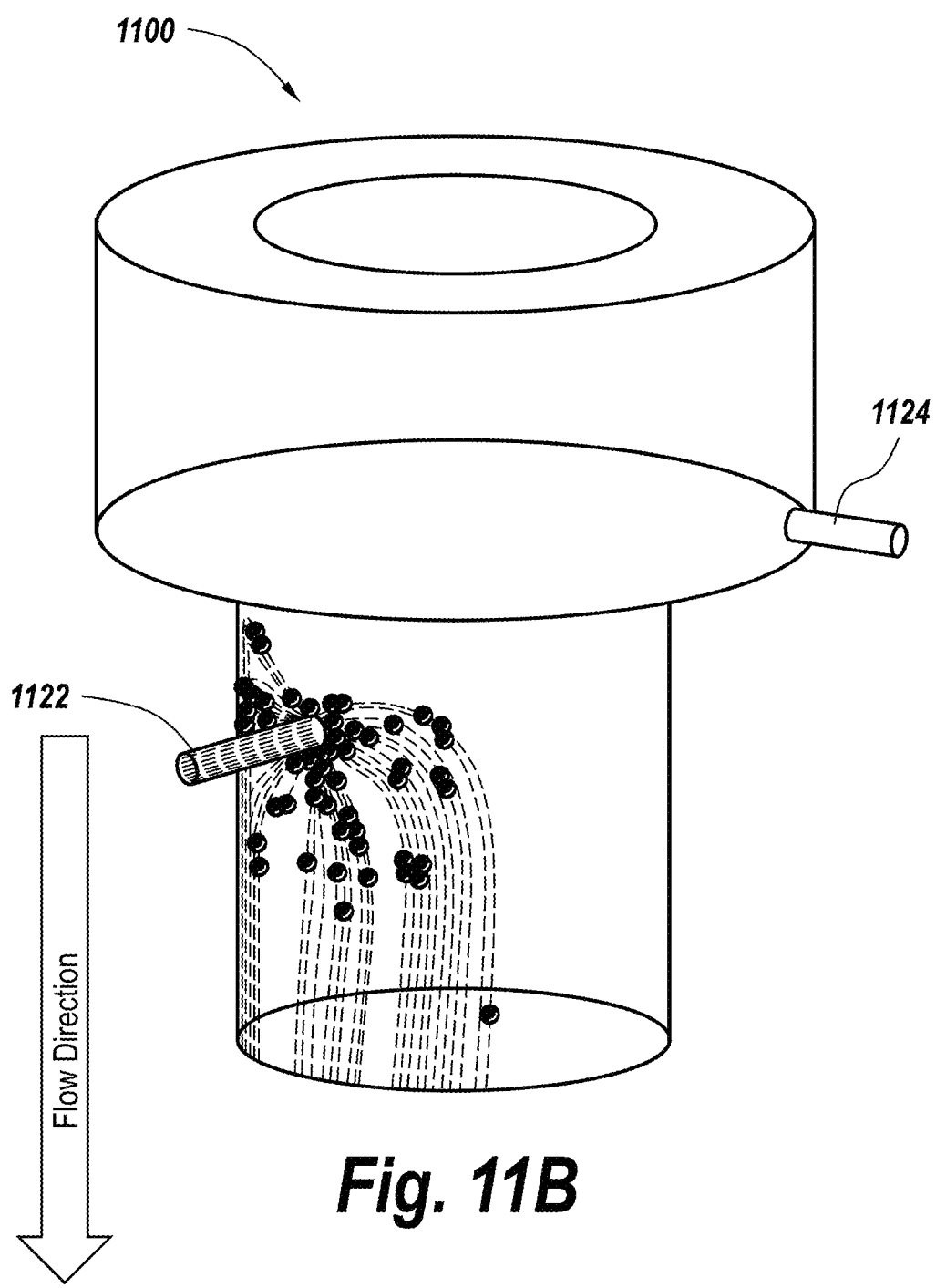
FIG. 11B represents a fluidic modeling diagram for a back pressure regulator with a make-up flow source.

FIG. 11A and FIG. 11B show a fluidic modeling diagram of a headspace of needle-and-seat type back pressure regulator 1100 according to an embodiment of this disclosure. In FIG. 11A, the make-up flow enters the headspace of needle-and-seat type back pressure regulator 1100 at inlet 1124 and predominately fills the headspace, while the mobile phase enters at inlet 1122 and preferentially flows downward, toward the variable restrictor. This effect is even more apparent in FIG. 11B, in which the lines associated with the make-up flow have been removed and only the lines associated with the mobile phase flow are depicted. That is, in FIG. 11B, the modeling includes the effect of the make-up flow on the mobile phase flow, but the make-up flow lines themselves are not depicted to highlight the behavior of the mobile phase flowpath.

As shown in FIG. 11A and FIG. 11B, the degree of mobile phase diffusion into the unswept volume above and around the solvent entry point is minimal such that the mobile phase passes directly toward the variable restriction. The fluid model demonstrates that the mobile phase flow travels along the intended direction of flow and does not show any portions which follow a significantly longer flow path. By contrast, a portion of mobile phase entering the unswept volume will experience a longer flow path and will rejoin the major portion of the mobile phase at a later point in the flowstream, resulting in band broadening and, in extreme cases, shouldering and peak splitting. By avoiding this diffusion, a tight sample band is passed from the back pressure regulator to the detector.

EXAMPLE 2

Figure 12:
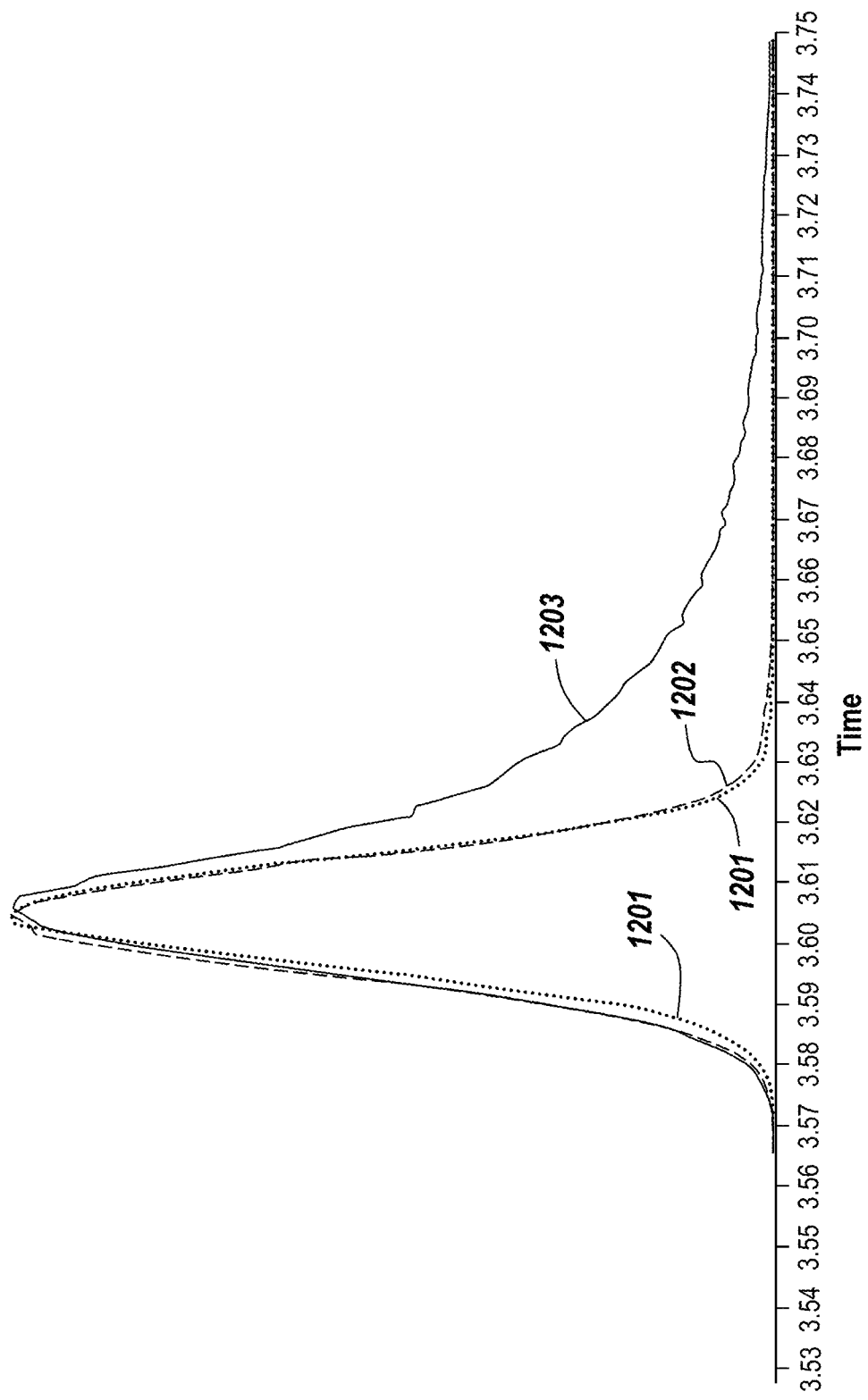
FIG. 12 provides overlaid chromatograms for a caffeine analysis.

FIG. 12 shows a significant reduction in peak broadening achieved using an embodiment of this disclosure. FIG. 12 includes an overlay of three chromatograms, each of which is a total ion chromatogram for a caffeine sample separation using a mass spectrometer detector with electrospray ion source in positive ion mode. Trace 1201 is a peak measured from a sample that was not passed through the back pressure regulator. Since it has not passed through the back pressure regulator, the sample associated with trace 1201 has not experienced any sample band spreading associated with the back pressure regulator due to extra-column volume and/or unswept volume. Trace 1201 is sharp (eluting in about 3.605 seconds) and symmetrical. Trace 1203 is a peak measured following the same method, except that the sample was passed through a back pressure regulator without the present technology. That is, the back pressure regulator was standard commercial stock that was not tailored to reduce internal volume. Trace 1203 shows a peak that is significantly broadened as compared to trace 1201, and which exhibits considerable tailing and some shouldering. Trace 1202 is also a peak measured following the same method, but in which a make-up flow was introduced into the back pressure regulator according to the present technology. Trace 1202 is a sharp, symmetrical peak, substantially identical to trace 1201 and with significantly less broadening and shouldering than in trace 1203.

Example 2 demonstrates embodiments of the present technology significantly reduces or eliminates band-broadening contributed by a back pressure regulator, permitting a separation quality on par with a separation performed in the complete absence of a back pressure regulator. Thus, a user may achieve the advantages associated with a back pressure regulator, such as good pressure control with reasonable cost, and robust and wear-resistant operation, without sacrificing separation quality.

EXAMPLE 3

Example 3 provides an example in which a back pressure regulator is configured to reduce the internal volume of the back pressure regulator. As one of ordinary skill in the art would appreciate, any one of the modifications described herein could be used alone or any combination of these modifications may be used together. Further, the configured back pressure regulator may be used in an embodiment also equipped with a make-up solvent flow used to channel mobile phase through the internal volume as described above, or the configured back pressure regulator may be used without a make-up solvent flow.

Figure 13:
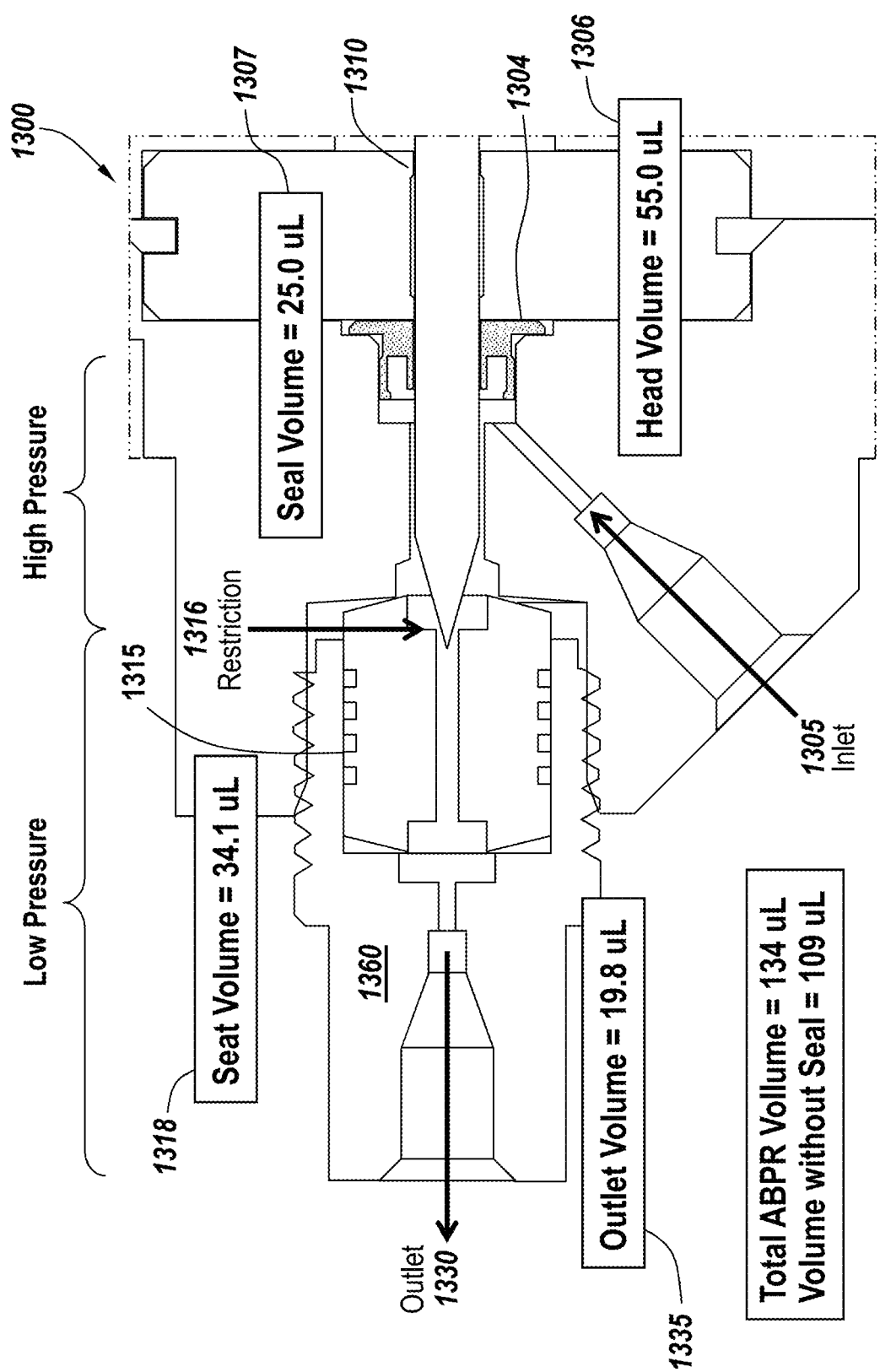
FIG. 13 schematically illustrates a needle-and-seat type back pressure regulator that is not configured to reduce internal volume.

FIG. 13 shows back pressure regulator 1300 which has not been configured for reduced internal volume (i.e., standard commercial stock BPR). Back pressure regulator 1300 includes an inlet 1305, seal 1304, needle 1310, seat 1315, and outlet 1330. Needle 1310 and seat 1315 define restriction 1316 at which needle 1310 would meet seat 1315 at one extreme of the range of motion of needle 1310. Back pressure regulator 1300 also includes internal volumes that may be occupied by the mobile phase flowstream when the back pressure regulator is in use in a chromatographic separation. Head volume 1306 (55.0 µL) includes the portions of the flowstream from the inlet up to seal 1304, along needle 1310 and up to seat 1315. Seal volume 1307 (25.0 µL) is within seal 1304. Seat volume 1318 (34.1 µL) is within seat 1315. Outlet volume 1335 (19.8 µL) is downstream of seat 1315 at outlet 1330. The total internal volume of these components is 134 µL (109 µL excluding seal volume 1307.)

Figure 14:
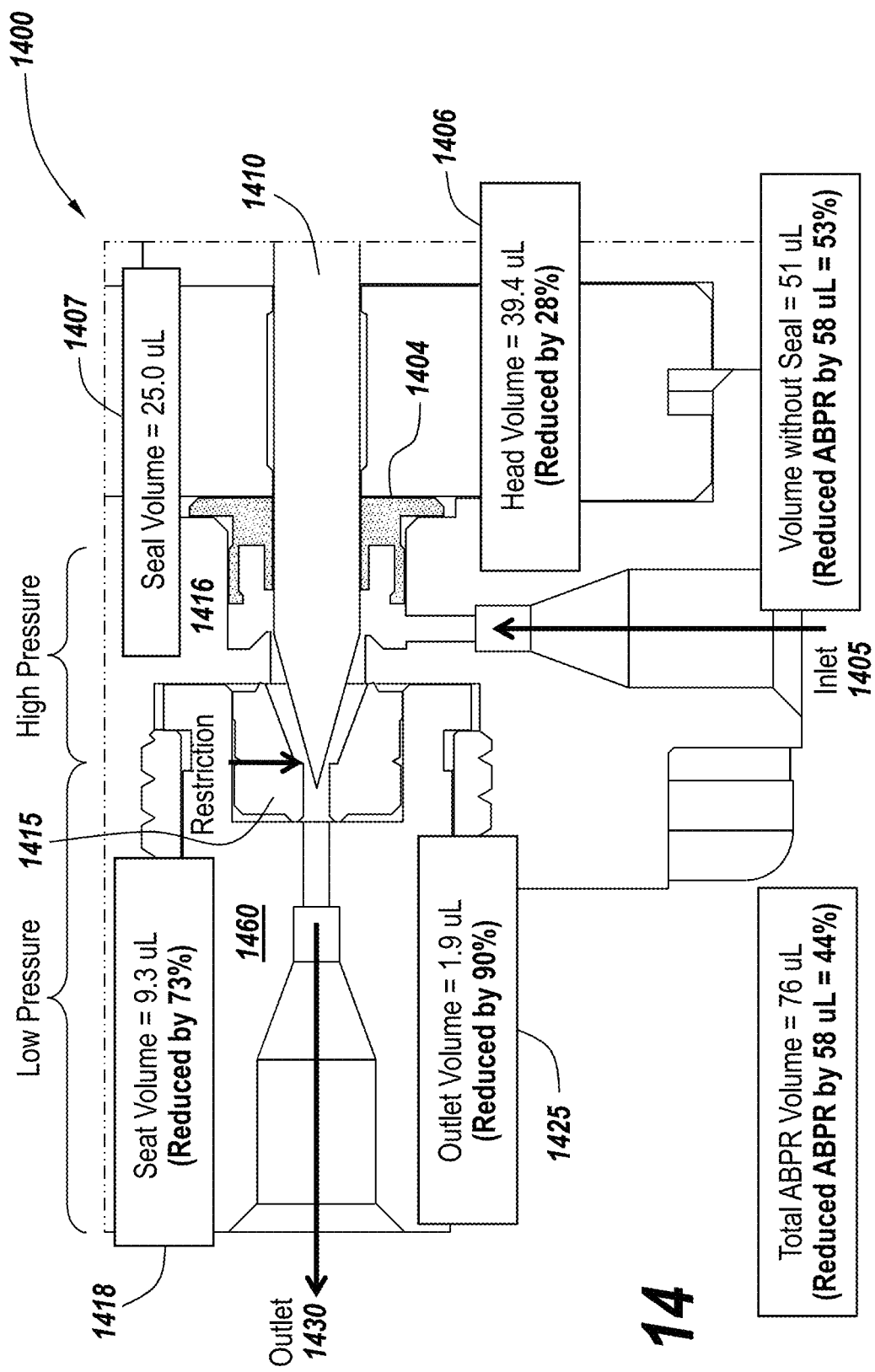
FIG. 14 schematically illustrates a needle-and-seat type back pressure regulator that is configured to reduce internal volume.

FIG. 14 shows back pressure regulator 1400, which has been configured for reduced internal volume. Back pressure regulator 1400 contains the same basic components: Back pressure regulator 1400 includes an inlet 1405, seal 1404, needle 1410, seat 1415, and outlet 1430. Needle 1410 and seat 1415 define restriction 1416 at which needle 1410 would meet seat 1415 at one extreme of the range of motion of needle 1410. Back pressure regulator 1400 also includes internal volumes that may be occupied by the mobile phase flowstream when the back pressure regulator is in use in a chromatographic separation. Head volume 1406 (39.4 µL) includes the portions of the flowstream from the inlet 1405 up to seal 1404, along needle 1410 and up to seat 1415. Seal volume 1407 (25.0 µL) is within seal 1404. Seat volume 1418 (9.3 µL) is within seat 1415. Outlet volume 1425 (1.9 µL) is downstream of seat 1415 at outlet 1430.

Back pressure regulator 1400 is configured for reduced internal volume. That is, the relationships and positioning of various BPR components have been tailored to reduce internal volume (e.g., to minimize unswept volume). It should be appreciated that while the BPR shown in FIG. 14 has been tailored in multiple ways, a BPR does not need to be tailored in every way shown in FIG. 14 to achieve at least some advantage over commercially available BPRs. Head volume 1406 has been reduced to 39.4 µL (28% reduction) by locating inlet 1405 proximate seat 1415 and providing inlet 1405 perpendicular to needle 1410 reducing the length of the flowpath to needle 1410. Seal 1404 is positioned closer to seat 1415. Seal volume 1407 is not reduced in the back pressure regulator 1400 as depicted. Seat volume 1418 has been reduced to 9.3 µL (73% reduction) by reducing the length of seat 1415, and shaping seat 1415 so that its interior cross-section more closely approximates the shape of needle 1410. Restriction 1416 is configured to define a sharp point at the interface of conical and cylindrical portions of seat 1415. Outlet volume 1430 has been reduced to 1.9 µL (90% reduction) by connecting outlet 1430 directly to the flowpath from seat 1415. Comparison of FIG. 13 to FIG. 14 also provides an example of reducing volume by reducing cross-sectional area at interfaces between BPR components. Seat volume 1418 and outlet volume 1425 are each reduced by minimizing the cross-sectional area at the interface of outlet 1430 and seat 1416 is configured such that it is not larger than the size of the flowpath. The total internal volume of back pressure regulator 1400 is 76 µL, a 44% reduction as compared to back pressure regulator 1300, or, excluding seal volume, 51 µL (53% reduction). In general, interfaces between components in unmodified back pressure regulators may have a larger area than the flowpath within the components and reducing these areas may reduce the volume within the back pressure regulator. Further reductions can be achieved, in some embodiments, by minimizing the inlet and outlet internal diameter dimensions. Although, it should be noted that minimizing the inlet and/or outlet will affect flow rate, and may not be possible in all embodiments.

EXAMPLE 4

Figure 15:
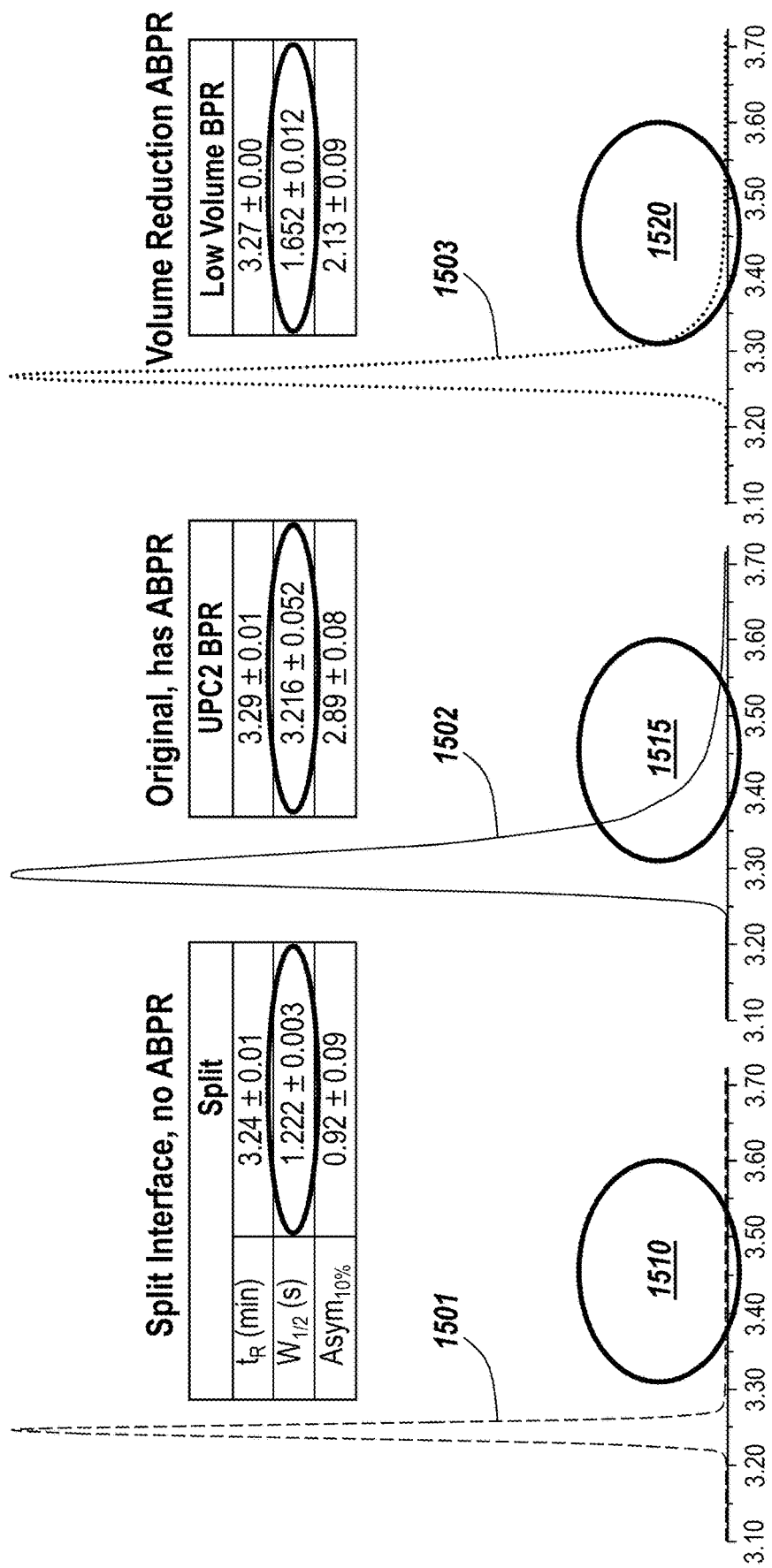
FIG. 15 provides three chromatograms showing band effects for various systems.

FIG. 15 shows a significant reduction in band distortion effects achieved using BPR 1400. FIG. 15 provides chromatograms for three various BPR designs and illustrates the effects on peak broadening and tailing. Trace 1501 is a peak measured from a sample that was not passed through a single flow path including both a back pressure regulator and a detector. That is, trace 1501 is a peak measured from a sample in a system having a split-flow interface design, where a make-up solvent is provided to the BPR, and the detector is split from the flow line extending directly from the column. Since a sample that is associated with a split-interface design is not affected by the amount of unswept volume in a BPR, the sample associated with trace 1501 has not experienced any sample band spreading—see area 1510. Trace 1501 is sharp and symmetrical having a half width of about 1.22. Trace 1502 is a peak measured following the same method, except that the sample was passed through a back pressure regulator without the present technology. That is, the back pressure regulator was standard commercial stock, that was not tailored to reduce internal volume and instead of a split-flow interface as was used for the sample provided in trace 1501, a BPR interface flow design where the BPR is positioned on the same flow path between the column and the detector. Trace 1502 shows a peak that is significantly broadened as compared to trace 1501 (compare half widths of 1.22 for trace 1501 to a half width of 3.22 for 1502), and which exhibits considerable tailing and some shouldering in area 1515. Trace 1503 is also a peak measured in a system using the BPR interface design but including, BPR 1400 (FIG. 14, and described in Example 3) configured with reduced internal volume according to the present technology. Trace 1503 is a sharp, symmetrical peak, that is more closely aligned with trace 1501 (compare half widths of 1.22 for trace 1501 to 1.65 for trace 1503) and with significantly less broadening and shouldering in area 1520 than in trace 1502.

Example 4 demonstrates embodiments of the present technology significantly reduces or eliminates band-broadening contributed by a back pressure regulator, permitting a separation quality on par with a separation performed in a split interface design. Thus, a user may achieve the advantages associated with a back pressure regulator, such as good pressure control with reasonable cost, and robust and wear-resistant operation, without sacrificing separation quality.

EXAMPLE 5

Referring to FIGS. 13 and 14 and the prior art BPR 1300 versus the BPR 1400 tailored to provide a reduced internal volume, there is an obvious design change to the seat components (e.g., compare seat 1315 to seat 1415). Seat 1415 has a reduced seat volume of about 73%. To accomplish such a large reduction, while still maintaining a pressure tight seal between the low pressure outlet and high pressure head components involves numerous reconfigurations. FIG. 16 is an enlarged view of the connection between the head portion 1440 (high pressure portion) and the outlet 1430 (located in the low pressure portion). In general, and as is the case in the prior art BPR shown in FIG. 13, the outlet 1430 (or 1330 in FIG. 13) is located in a housing 1460 (or housing 1360 for the prior art BPR). To create a pressure tight seal in the regulators and for maintenance of the regulators, the securement nut is rotatably secured (i.e., torqued) to the head. In prior art devices the seat 1315 is directly coupled to the threaded housing 1360. As a result, whenever the outlet portion is secured into the head the housing and seat rotate together and the high shear forces acting at the ends of the seat 1315 degrade the seat and limit limiting the number of installations the seat 1315 can withstand.

The seat 1415 shown in FIGS. 14 and 16 however is not coupled to the securement mechanism (e.g., nut) 1465. That is, the seat 1415 is rotatably decoupled from the securement mechanism 1465 allowing for a more direct connection between the head 1440 and the outlet 1430 (e.g., minimizes internal volume) and prevents undesirable shearing of the seat during installation events.

Figure 17A:
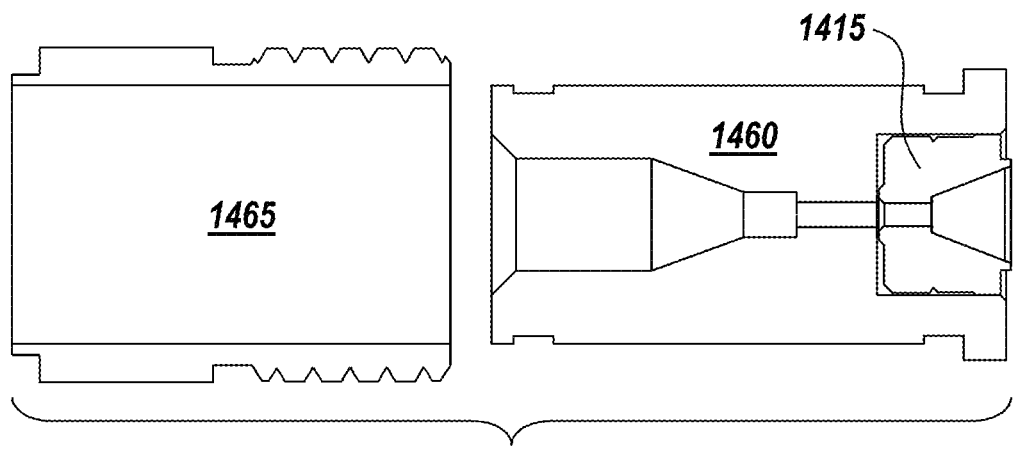
FIGS. 17A-C illustrates a method of connecting a seat to a housing to provide a rotatably decoupled connection. In a first step, the seat is press-fit into a housing and a threaded nut slides over the housing (FIG. 17A). In the next step, the nut is aligned with external groves in the housing (FIG. 17B). In a final step, an end of the nut is crimped to the housing to provide free rotation of the nut about a seat that moves only in the axial direction when the nut is rotated (FIG. 17C).
Figure 17B:
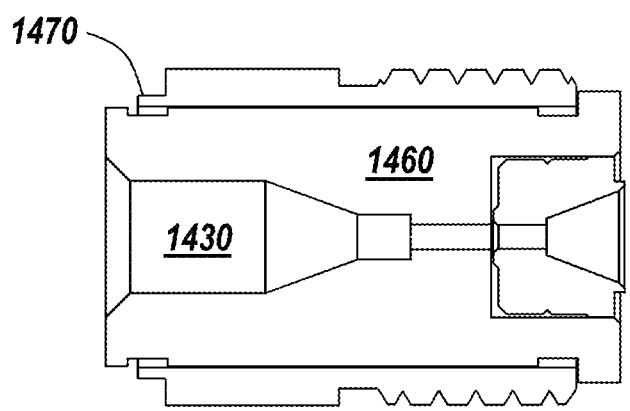
Figure 17C:
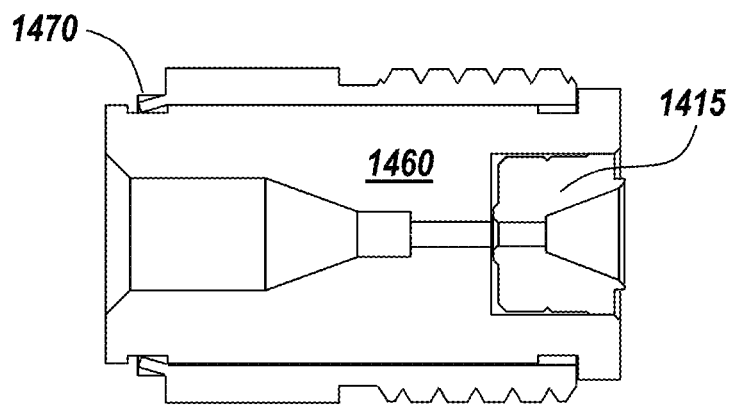

In particular, the components of BPR 1400 can be configured and installed using the following techniques to minimize internal volume as well as reduce shearing forces on seat 1415. A method of installation is shown in FIGS. 17A-C, in which seat 1415 is first press-fit into housing 1460. A threaded nut 1465 is slid over the housing 1460 as shown in FIG. 17A. To provide the rotatably decoupled connection between the housing and the nut, the nut is positioned over one or more exterior groves in the housing as shown in FIG. 17B, and the ends 1470 of the nut are crimped to the housing as shown in FIG. 17C. This type of connection allows the nut 1465 to freely rotate around the housing 1460. As a result, when housing 1460 including seat 1415 is installed in head portion 1440 it can be tightened/secured as needed through rotation without any shearing effects on seat 1415. That is, while nut 1465 is rotated and tightened to create a pressure seat with the head, seat 1415 does not rotate, but rather moves axially toward needle 1410. This installation and seat design allows for a more robust connection as the seat 1415 does not experience shear. As a result, the housing 1460 can be removed and reinstalled multiple times without destroying the seat 1415.

Figure 18:
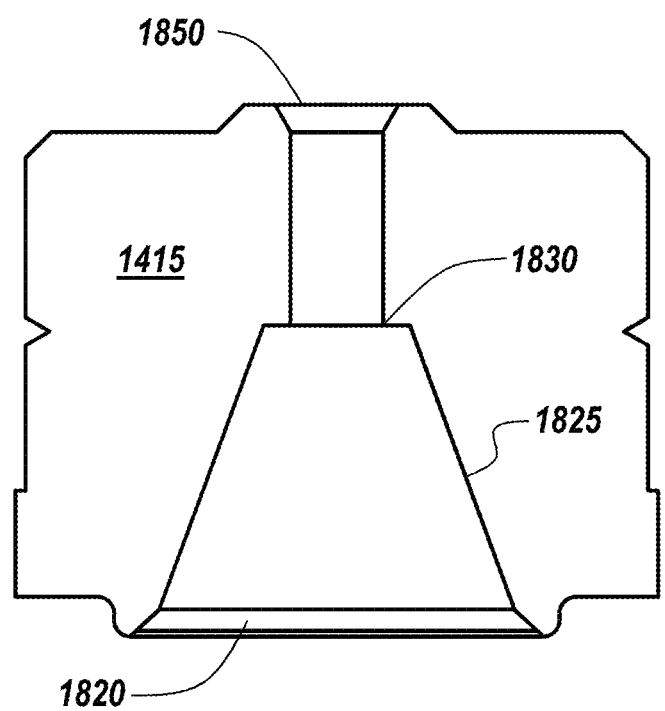
FIG. 18 is a cross-sectional view of seat shown in FIGS. 14, 16, and 17. The seat has a geometry designed for reduced internal fluid volume.

In addition to robustness, the seat 1415 has a reduced internal fluid volume. As the seat 1415 is press-fit into the housing 1460, the outlet 1430 and the point of restriction at the needle 1410 can be positioned closer together, thereby eliminating volume. In addition, the geometry of the seat can be tailored to address the demands of the seat—as the seat is located at the interface between high and lower pressure zones. That is, one end of the seat interacts with the tip of the needle 1410 and is exposed to high pressures, whereas the opposing end of the seat interfaces with the outlet 1430 and is on the low pressure side of the regulator. To address these demands and to eliminate excess fluid paths within the seat, the seat 1415 has a tailored geometry shown in FIG. 18. At a first end 1820 of the seat—that is an end that interfaces with the needle (high pressure side)—is formed to have a compliant surface that is angled and sized to allow the needle 1410 to be positioned within a range of axial positions therein. In certain embodiments, this portion of the seat's internal geometry includes surfaces 1825 that closely matches the profile of the needle 1410 to provide a tight connection and to allow the flow path to be tailored for a range of needle displacement through this first portion of the seat. The first end 1820 is compliant and can deform especially during installation to allow for proper positioning of the seat with the head portion 1440. The internal geometry of the seat transitions at point 1830 from a cone or angled volume to a more narrowly tailored straight cylinder to address the demands of the low pressure side. The opposing end 1850 of the seat, which is the side of the seat that interfaces with the outlet 1430 includes a small flange (e.g., a raised surface) creating a face seal. Using finite element analysis it was found that the small flange or boss on end 1850 assists in controlling deformation into the seat inner diameter during use. Utilizing finite element analysis, stress conditions around the ends of the seat 1415 were studied and localized stress conditions were found to be in acceptable levels.

One of ordinary skill in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

The invention claimed is:

1. A needle-valve-type back pressure regulator comprising:
   a valve seat having an axial passageway therethrough;
   a needle comprising a tip and a shaft, the needle positioned parallel to the axial passageway of the valve seat and having a range of motion in a direction parallel to the axial passageway, such that at one extreme of the range of motion the tip is seated within the axial passageway;
   a channel positioned adjacent to the valve seat through which at least a portion of the needle moves along its range of motion;
   a headspace constituting a void defined by the unoccupied portions of the axial passageway and the channel;
   a mobile phase inlet within the headspace; and
   a make-up flow inlet within the headspace, wherein the mobile phase inlet and the make-up flow inlet are located at two different and distinct positions within the headspace.

2. The needle-valve-type back pressure regulator of claim 1, further comprising a drive mechanism in communication with the needle to determine the position of the needle within its range of motion.

3. The needle-valve-type back pressure regulator of claim 1, wherein the mobile phase inlet is between the make-up flow inlet and the valve seat.

4. The needle-valve-type back pressure regulator of claim 1, wherein the valve seat comprises a restriction, the restriction located such that the tip is seated against the restriction at one extreme of the range of motion.

5. The needle-valve-type back pressure regulator of claim 3, wherein the mobile phase inlet and the make-up flow inlet are approximately perpendicular to the axial passageway.

6. The needle-valve-type back pressure regulator of claim 3, wherein the mobile phase inlet is angled toward the valve seat and the make-up flow inlet is approximately perpendicular to the axial passageway.

7. The needle-valve-type back pressure regulator of claim 3, wherein the mobile phase inlet and the make-up flow inlet are each angled toward the valve seat.

8. The needle-valve-type back pressure regulator of claim 3, wherein the mobile phase inlet and the make-up flow inlet are offset from each other such that a projection of each on a plane perpendicular to the axial passageway forms an angle of approximately 120 degrees.

9. The needle-valve-type back pressure regulator of claim 4, wherein the mobile phase inlet is as near as practicable to the restriction.

10. A method of operating the back pressure regulator having a needle-and-seat valve of claim 1, the method comprising:
    providing a make-up flow to an interior volume of the needle-and-seat valve at a make-up flow inlet;
    flowing the make-up flow through at least a portion of the interior volume and through a variable restrictor of the needle-and-seat valve to create a flowstream;
    introducing a mobile phase flow to a portion of the flowstream; and
    adjusting the variable restrictor of the needle-and-seat valve to achieve a desired pressure within the mobile phase flow.

11. The method of claim 10, wherein the mobile phase flow and the make-up flow each comprise carbon dioxide.

12. The method of claim 10 wherein the mobile phase comprises carbon dioxide, and the make-up flow comprises a liquid solvent and is substantially absent carbon dioxide.

13. The method of claim 12, wherein the make-up flow comprises methanol.

14. The method of claim 10, further comprising providing the mobile phase flow in a direction angled toward the variable restrictor.

15. The method of claim 10, wherein the mobile phase flow has a greater flow rate than the make-up flow.

16. A preparatory chromatography system comprising:
    a mobile phase source configured to provide a mobile phase flow;
    a chromatographic column downstream of the mobile phase source;
    the back pressure regulator of claim 1 located downstream of the chromatographic column and having an interior volume;
    a fraction collector located downstream of the back pressure regulator; and
    wherein the back pressure regulator is configured to reduce exposure of the mobile phase flow to the interior volume by (i) receiving a make-up flow wherein the make-up flow channels the mobile phase flow through only a portion of the interior volume or/and (ii) wherein the interior volume is minimized by one or more of (a) placing an inlet point for the mobile phase flow immediately proximate a constriction point of the back pressure regulator; (b) placing a seal proximate the inlet point distant from the constriction point; (c) placing the inlet point such that mobile phase flow is introduced perpendicular or angled toward a restriction of the back pressure regulator; (d) placing an outlet receptor immediately proximate and downstream from the constriction point; or (e) reducing cross-sectional area at interfaces within the back pressure regulator.

* * * * *